United States Patent
Ohashi et al.

(10) Patent No.: US 12,301,077 B2
(45) Date of Patent: May 13, 2025

(54) COIL MOUNTING APPARATUS

(71) Applicant: HONDA MOTOR CO., LTD., Tokyo (JP)

(72) Inventors: Yasuto Ohashi, Tokyo (JP); Norihiko Hikima, Tokyo (JP); Shoma Okubo, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 432 days.

(21) Appl. No.: 17/676,244

(22) Filed: Feb. 21, 2022

(65) Prior Publication Data

US 2022/0302806 A1    Sep. 22, 2022

(30) Foreign Application Priority Data

Mar. 18, 2021  (JP) ................................. 2021-044810

(51) Int. Cl.
*H02K 15/062* (2025.01)
*H02K 3/12* (2006.01)

(52) U.S. Cl.
CPC ............. *H02K 15/062* (2013.01); *H02K 3/12* (2013.01)

(58) Field of Classification Search
CPC ...... H02K 15/062; H02K 15/066; H02K 3/12; H02K 3/345
See application file for complete search history.

(56) References Cited

U.S. PATENT DOCUMENTS

| | | | | |
|---|---|---|---|---|
| 4,358,099 | A * | 11/1982 | Hamane | H02K 15/068 269/93 |
| 5,062,200 | A * | 11/1991 | Lanfranco | H02K 15/024 29/281.1 |
| 5,826,321 | A | 10/1998 | Pease | |
| 8,826,513 | B2 * | 9/2014 | Guercioni | H02K 15/0421 29/598 |
| 9,698,658 | B2 * | 7/2017 | Yamaguchi | H02K 15/065 |
| 2004/0207282 | A1 | 10/2004 | Toshiaki et al. | |
| 2022/0302806 | A1 * | 9/2022 | Ohashi | H02K 3/345 |

(Continued)

FOREIGN PATENT DOCUMENTS

| CN | 208707492 U | 4/2019 |
|---|---|---|
| CN | 212162961 U | 12/2020 |

(Continued)

OTHER PUBLICATIONS

Office Action issued Mar. 18, 2025 in the CN Patent Application No. 2022010178902.9.

*Primary Examiner* — Minh N Trinh
(74) *Attorney, Agent, or Firm* — CKC & PARTNERS CO., LLC

(57) ABSTRACT

The coil mounting apparatus includes a stator core fixing jig, a coil winding jig that is arranged inside the stator core and has thereon an annularly wound belt-shaped coil, and a cuff guide that is provided on the stator core fixing jig and has a guide groove for supporting the cuff portion. The guide groove includes a cuff portion-supporting sub-groove that supports the cuff portion from both sides in a circumferential direction of the stator core, and a coil-guiding sub-groove that is located further away from the axial end face of the stator core than the cuff portion-supporting sub-groove and that has a groove width smaller than that of the cuff portion-supporting sub-groove.

7 Claims, 26 Drawing Sheets

(56) References Cited

U.S. PATENT DOCUMENTS

2022/0302807 A1* 9/2022 Ohashi ................ H02K 15/066
2023/0318414 A1* 10/2023 Hikima ................ H02K 15/026
　　　　　　　　　　　　　　　　　　　29/596

FOREIGN PATENT DOCUMENTS

EP　　　　1073180 A1　　1/2001
JP　　　　3982446 B2　　9/2007

* cited by examiner

COIL MOUNTING APPARATUS

This application is based on and claims the benefit of priority from Japanese Patent Application No. 2021-044810, filed on 18 Mar. 2021, the content of which is incorporated herein by reference.

BACKGROUND OF THE INVENTION

Field of the Invention

The present invention relates to a coil mounting apparatus and a coil mounting method.

Related Art

There has been conventionally known a method for mounting an annularly wound coil in a slot of a stator core by inserting the annularly wound coil inside the stator core and moving an in-slot accommodation portion of the coil from inside toward outside with respect to slots of the stator core (for example, see Patent Document 1).

In the above-mentioned related art, after the coil is wound around a cylindrical insertion jig having grooves on the outer periphery thereof and inserted inside the stator core, the coil wound around the insertion jig is expanded in diameter by an expanding jig.

Patent Document 1: Japanese Patent No. 3982446

SUMMARY OF THE INVENTION

An insulating paper sheet is disposed in each of the slots of the stator core to insulate the coil from the stator core. Therefore, when the annular coil inserted inside the stator core is expanded in diameter and inserted into each slot, there is a risk that the insulating paper sheet is damaged by being caught between the coil and the inner wall surface of the slot.

However, the above-mentioned related art does not disclose any specific device or method for preventing the insulating paper sheet from being caught by the coil in the slot.

An object of the present invention is to provide a coil mounting apparatus and a coil mounting method which eliminate or reduce the risk that straight portions of an annularly wound belt-shaped coil catch insulating paper sheets in slots when the straight portions of the belt-shaped coil are inserted into the slots from the inside of a stator core.

(1) An embodiment of the present invention is directed to a coil mounting apparatus (for example, a coil mounting apparatus 1 described later) for mounting an annularly wound belt-shaped coil (for example, a belt-shaped coil 100 described later) to a stator (for example, a stator core 2 described later) along a circumferential direction of the stator core by inserting straight portions (for example, straight portions 102 described later) of the annularly wound belt-shaped coil from an inside of the stator core into slots (for example, slots 22 described later) each having an insulating paper sheet (for example, an insulating paper sheet 24 described later) disposed therein, the insulating paper sheet having a cuff portion (for example, a cuff portion 24a described later) protruding from an axial end face (for example, an end face 2a described later) of the stator core. The coil mounting apparatus includes: a stator core fixing jig (for example, a stator core fixing jig 3 described later) that fixes the stator core at a predetermined position and in a predetermined posture; a coil winding jig (for example, a coil winding jig 4 described later) that is arrangeable inside the stator core fixed to the stator core fixing jig and is configured to have thereon the annularly wound belt-shaped coil while the straight portions of the belt-shaped coil are inserted into inter-comb-teeth grooves (for example, inter-comb-teeth grooves 43 described later) arranged radially on an outer periphery of the coil winding jig; and a cuff guide (for example, a cuff guide 33 described later) that is provided on the stator core fixing jig and has a guide groove (for example, a guide groove 331 described later) for supporting the cuff portion. The guide groove includes a cuff portion-supporting sub-groove (for example, a cuff portion-supporting sub-groove 331a described later) that supports the cuff portion from both sides in the circumferential direction of the stator core, and a coil-guiding sub-groove (for example, a coil-guiding sub-groove 331b) that is located further away from the axial end face of the stator core than the cuff portion-supporting sub-groove and that has a groove width (for example, a groove width W2 described later) smaller than that (for example, a groove width W1 described later) of the cuff portion-supporting sub-groove.

(2) In the coil mounting apparatus described in the foregoing (1), each of the inter-comb-teeth grooves of the coil winding jig has, in a radially outer portion thereof, a narrow portion (for example, a narrow portion 43a described later) having a groove width (for example, a groove width W3 described later) smaller than that of the coil-guiding sub-groove of the guide groove.

(3) An embodiment of the present invention is directed to a coil mounting method for mounting an annularly wound belt-shaped coil (for example, a belt-shaped coil 100 described later) to a stator (for example, a stator core 2 described later) along a circumferential direction of the stator core by inserting straight portions (for example, straight portions 102 described later) of the annularly wound belt-shaped coil from an inside of the stator core into slots (for example, slots 22 described later) each having an insulating paper sheet (for example, an insulating paper sheet 24 described later) disposed therein, the insulating paper sheet having a cuff portion (for example, a cuff portion 24a described later) protruding from an axial end face (for example, an end face 2a described later) of the stator core. The coil mounting method includes: supporting the cuff portion by a cuff portion-supporting sub-groove of a cuff guide (for example, a cuff guide 33 described later), the cuff guide having a guide groove (for example, a guide groove 331) including the cuff portion-supporting sub-groove (for example, a cuff portion-supporting sub-groove 331a described later) that supports the cuff portion from both sides in the circumferential direction of the stator core, and a coil-guiding sub-groove (for example, a coil-guiding sub-groove 331b described later) that is located further away from the axial end face of the stator core than the cuff portion-supporting sub-groove and that has a groove width (for example, a groove width W2 described later) smaller than that (for example, a groove width W1 described later) of the cuff portion-supporting sub-groove; and in a state where the cuff portion is supported by the cuff portion-supporting sub-groove, expanding the annularly wound belt-shaped coil in diameter, inserting the straight portions into the slots, and guiding movement of the straight portions by the coil-guiding sub-groove.

According to the foregoing (1), the cuff portion of the insulating paper sheet in each slot is supported from both sides in the circumferential direction of the stator core by the cuff portion-supporting sub-groove of the guide groove of the cuff guide. Therefore, the cuff portion is positioned with respect to the slot. In addition, each straight portion comes into contact with the coil-guiding sub-groove of the guide groove, so that the straight portion is guided into the slot without catching the cuff portion. Therefore, the coil mounting apparatus is provided which eliminates or reduces the risk that the straight portions of the annularly wound belt-shaped coil catch the insulating paper sheets in the slots when the straight portions are inserted into the slots from the inside of the stator core.

According to the foregoing (2), the straight portions undergo position correction due to the narrow portions, immediately before the straight portions in the inter-comb-teeth grooves of the coil winding jig are inserted into the slots of the stator core. Therefore, the straight portions in the inter-comb-teeth grooves can be smoothly received on the insulating paper sheets in the slots.

According to the foregoing (3), the cuff portion of the insulating paper sheet in the slot is supported from both sides in the circumferential direction of the stator core by the cuff portion-supporting sub-groove of the guide groove of the cuff guide, so that the cuff portion can be positioned with respect to the slot. Further, the straight portion is brought into contact with the coil-guiding sub-groove of the guide groove, making it possible to guide the straight portion into the slot without catching the cuff portion. Therefore, the coil mounting method is provided which eliminates or reduces the risk that the straight portions of the annularly wound belt-shaped coil catch the insulating paper sheets in the slots when the straight portions are inserted into the slots from the inside of the stator core.

DETAILED DESCRIPTION OF THE INVENTION

Figure 1:
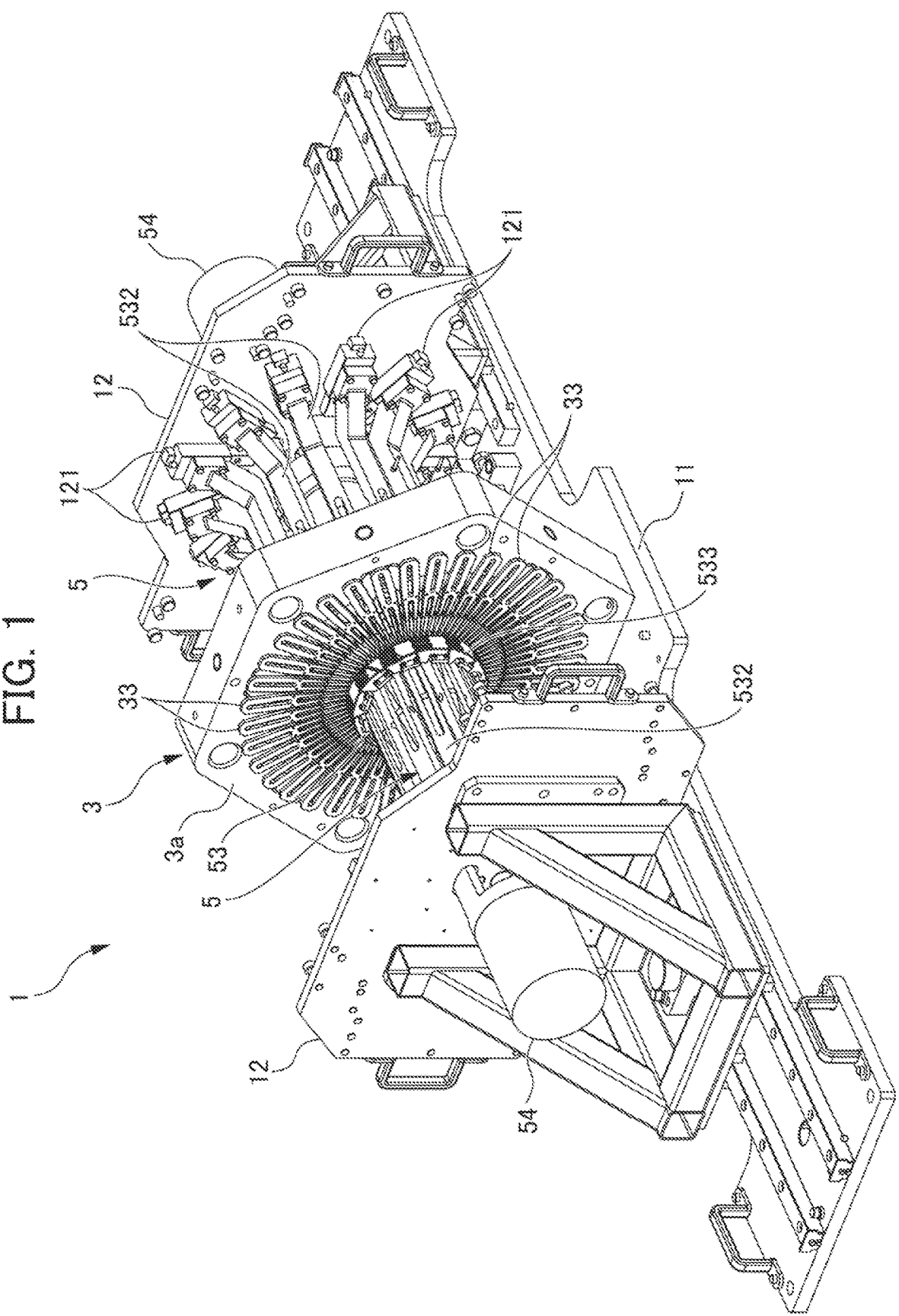
FIG. 1 is a perspective view showing a coil mounting apparatus according to an embodiment of the present invention.
Figure 2:
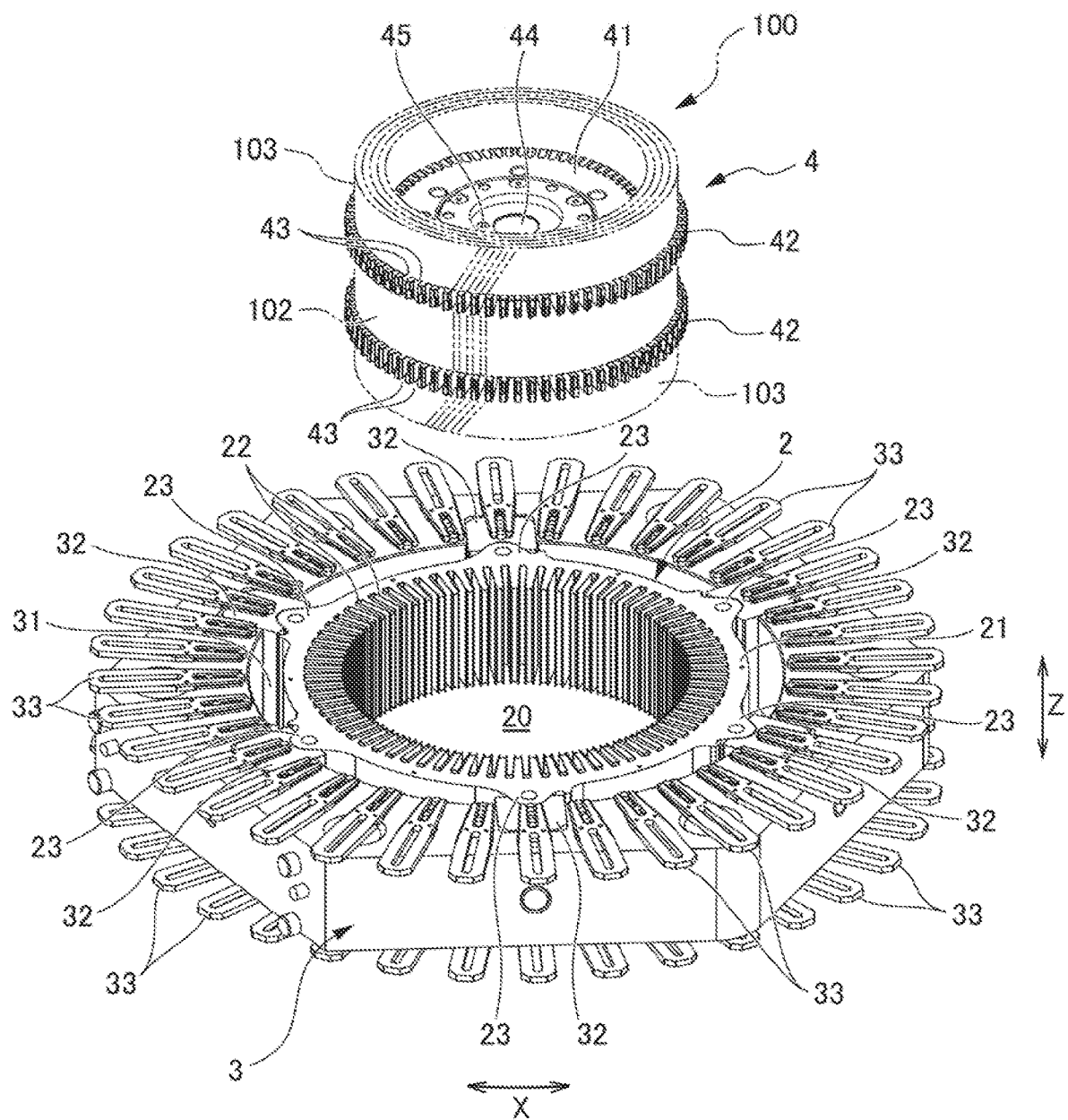
FIG. 2 is an exploded perspective view showing a stator core fixing jig having a stator core fixed thereto and a coil winding jig in a coil mounting apparatus.

An embodiment of the present invention will be described in detail with reference to the drawings. As shown in FIGS. 1 and 2, a coil mounting apparatus 1 includes a stator core 2, a stator core fixing jig 3 for fixing the stator core 2, a coil winding jig 4 which is inserted inside the stator core 2 and winds up a belt-shaped coil 100 in an annular shape therearound, and a coil expansion mechanism 5 for expanding the belt-shaped coil 100 wound around the coil winding jig 4.

Figure 3:
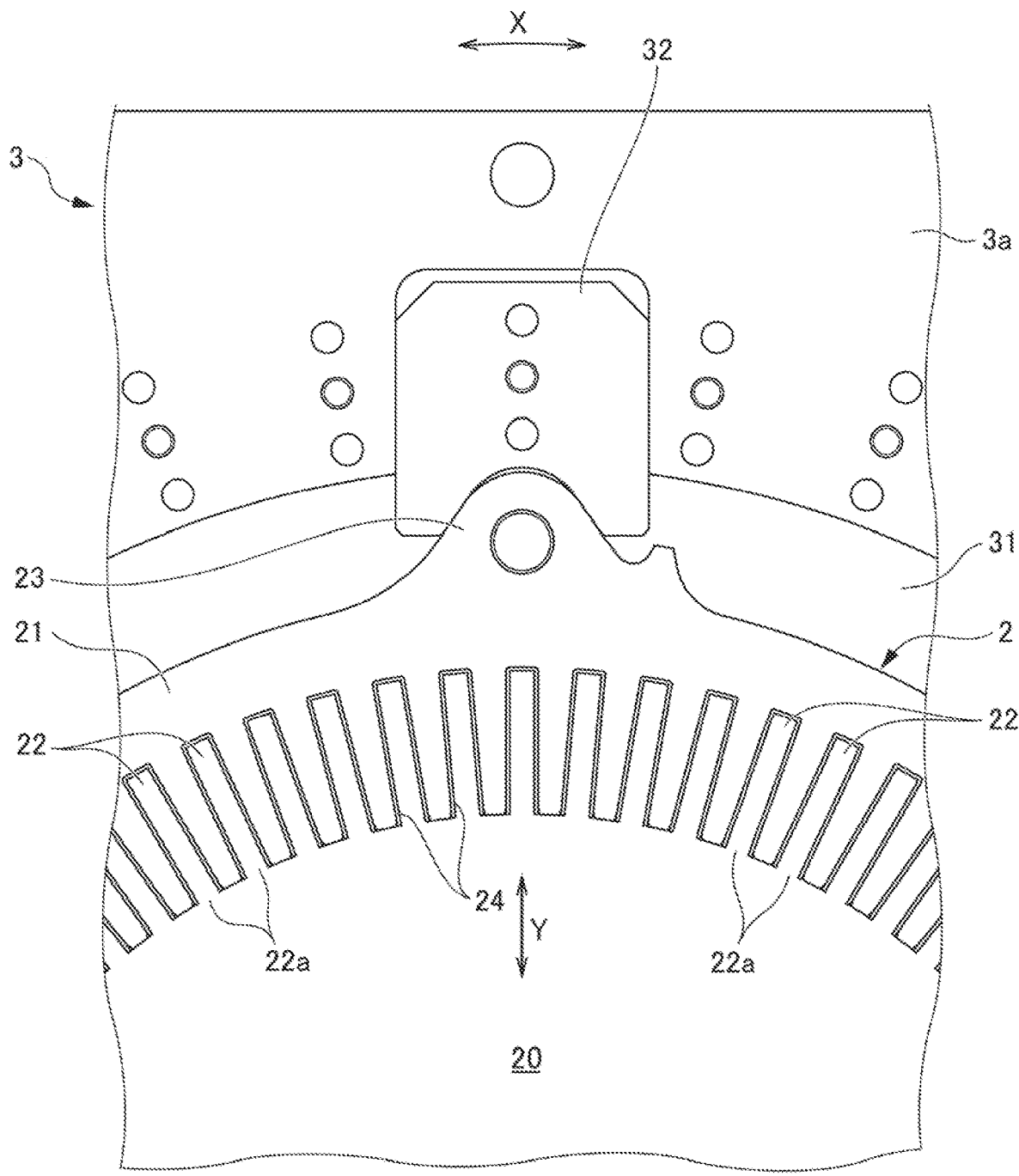
FIG. 3 is a partially enlarged view showing a fixing site of the stator core in the stator core fixing jig.

As shown in FIGS. 2 and 3, the stator core 2 includes an annular portion 21 consisting of, for example, a laminate including a plurality of thin core plates laminated together. The annular portion 21 has a through-hole 20 penetrating through the center of the annular portion 21 in an axial direction. The stator core 2 has a plurality of slots 22 penetrating therethrough in the axial direction of the stator core 2. The slots 22 are arranged radially at regular intervals in a circumferential direction of the annular portion 21, and have openings 22a that open to the through-hole 20 located inside in the radial direction of the annular portion 21. The stator core 2 of the present embodiment has 72 slots 22. The stator core 2 has six tabs 23 protruding at regular intervals from the outer circumference of the annular portion 21 of the stator core 2. As shown in FIGS. 2 and 3, with respect to the stator core 2 and the stator core fixing jig 3, an X direction in which the slots 22 are arranged refers to the circumferential direction, a Y direction extending radially from the center of the through-hole 20 refers to the radial direction, and a Z direction shown in FIG. 2 (the direction perpendicular to the page of FIG. 3) refers to the axial direction.

As shown in FIGS. 1, 2, and 3, the stator core fixing jig 3 has a hexagonal cylinder shape having an axial dimension which is substantially equal to the axial dimension of the stator core 2, and has, at the center thereof, a stator core insertion hole 31 in which the stator core 2 can be inserted and arranged. In the coil mounting apparatus 1 of the present embodiment, the stator core fixing jig 3 is fixed to a center portion of a base 11 of the coil mounting apparatus 1 so that the axial direction of the stator core 2 fixed in the stator core insertion hole 31 is parallel to the horizontal direction.

The stator core fixing jig 3 fixes the stator core 2 in the stator core insertion hole 31 at a predetermined position and in a predetermined posture. Specifically, as shown in FIGS. 2 and 3, the stator core fixing jig 3 has six core holding blocks 32 which are provided so as to correspond to the positions of the six tabs 23 of the stator core 2 and are movable so as to protrude into and retract from the inside of the stator core insertion hole 31. After the stator core 2 is inserted into the stator core insertion hole 31, the stator core fixing jig 3 causes the core holding blocks 32 to protrude into the stator core insertion hole 31 by driving an actuator such as a cylinder (not shown). As a result, as shown in FIG. 2, the core holding blocks 32 grip the tabs 23 of the stator core 2 respectively to fix the stator core 2 in the stator core insertion hole 31 at a predetermined position and in a predetermined posture.

Figure 4:
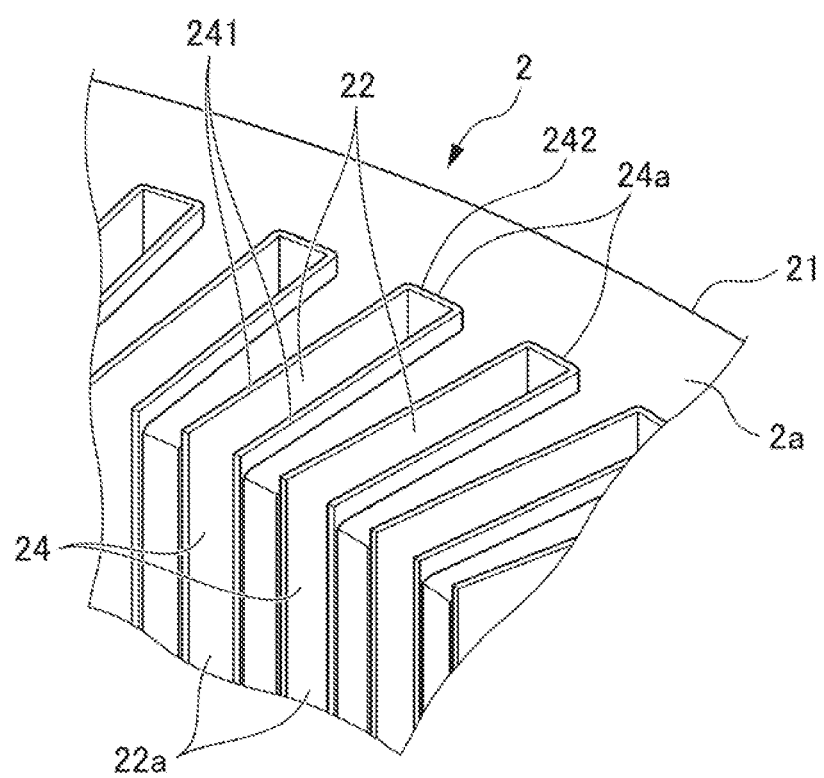
FIG. 4 is a perspective view showing insulating paper sheets disposed in slots of the stator core.

As shown in FIGS. 3 and 4, an insulating paper sheet 24 is disposed in advance in each of the slots 22 of the stator core 2 in advance. The insulating paper sheet 24 has a shape folded in a substantially U-shape so as to follow the shape of the inner surface of the slot 22 that is a substantially U-shape when the stator core 2 is viewed in the axial direction. In other words, the insulating paper sheet 24 has a pair of radial portions 241, 241 along the inner wall surface of the slot 22 extending in the radial direction of the stator core 2, and a circumferential portion 242 connecting radially outer ends of the radial portions 241, 241 to each other along the circumferential direction of the stator core 2.

As shown in FIG. 4, the insulating paper sheet 24 disposed in each of the slots 22 has a cuff portion 24a. The cuff portion 24a is constituted by parts of the radial portions 241, 241 and the circumferential portion 242 of the insulating paper sheet 24, the parts extending in the axial direction of the stator core 2 and protruding from the slot 22. Thus, the cuff portions 24a protrude outward from an axial end face 2a of the stator core 2. FIG. 4 shows only the cuff portions 24a at one end of the insulating paper sheets 24, which protrude from one end face 2a of the stator core 2, but cuff portions 24a at the other ends of the insulating paper sheets 24 also protrude from the other axial end face 2a of the stator core 2.

As shown in FIGS. 1 and 2, a plurality of cuff guides 33 are attached to both axial end faces 3a, 3a of the stator core fixing jig 3 to which the stator core 2 is fixed in advance, so that the cuff guides 33 are radially arranged at regular intervals along the circumferential direction. The cuff guides 33 are provided so as to be movable forward and backward along the radial direction of the stator core 2 by driving an actuator such as a cylinder (not shown). In FIG. 3, the cuff guides 33 are not illustrated in order to facilitate the understanding of the explanation of the core holding blocks 32.

Figure 5:
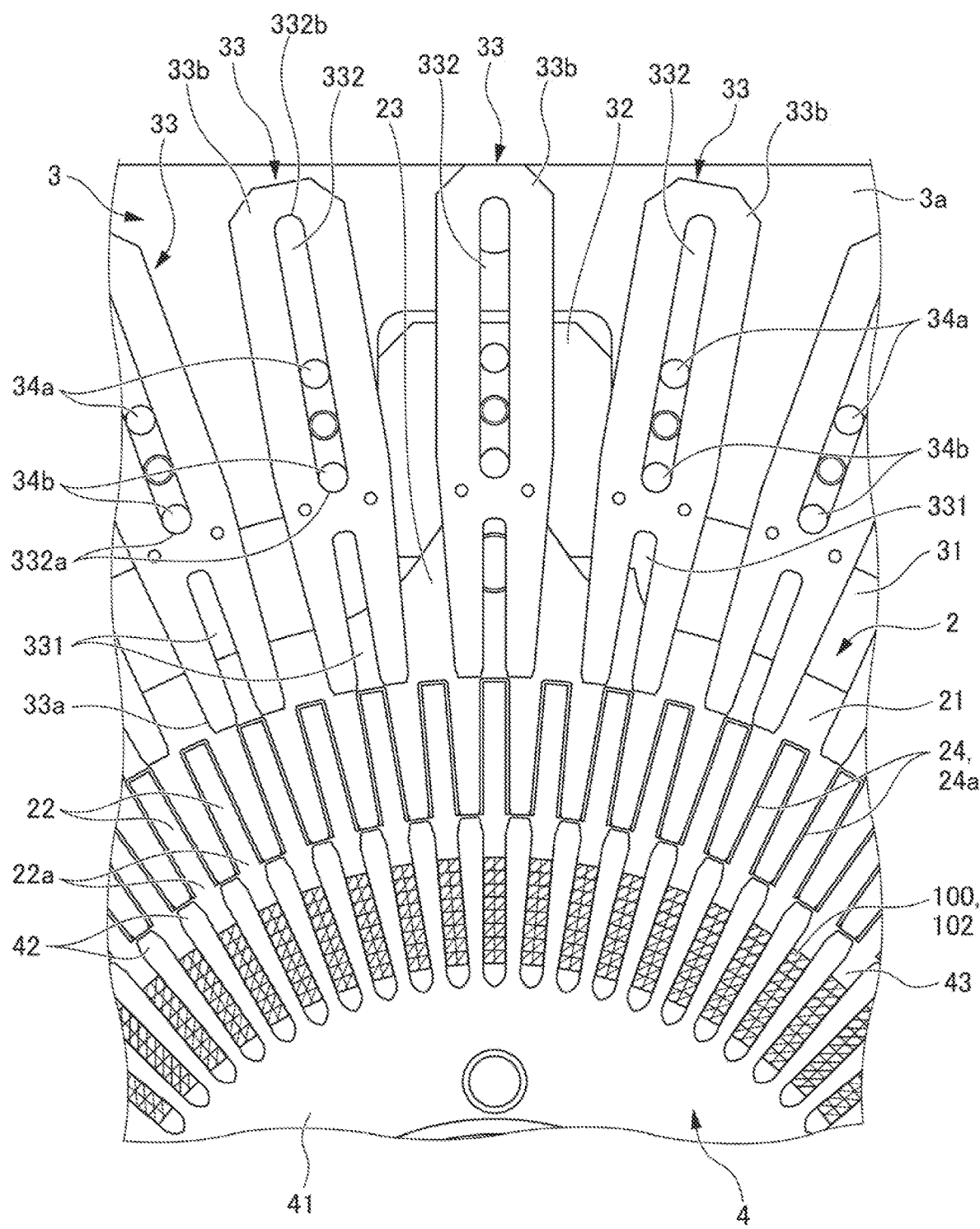
FIG. 5 is a partially enlarged view showing a state in which the slots of the stator core and inter-comb-teeth grooves of a coil winding jig are matched in phase with each other.

The cuff guides 33 are formed in an elongated thin-plate shape along the radial direction of the stator core 2. As shown in FIG. 5, each of the cuff guides 33 has, near its inner end 33a, a guide groove 331 which supports the cuff portion 24a of the insulating paper sheet 24 from both sides in the circumferential direction of the stator core 2. The guide groove 331 is a U-shape notch formed near the inner end 33a of the cuff guide 33, extends along the length direction of the cuff guide 33, and opens to the inside of the stator core fixing jig 3. Each cuff guide 33 has, near its outer end 33b that located outside with respect to the guide groove 331, an elongated hole 332 for restricting a radial movement range of the cuff guide 33.

Figure 6:
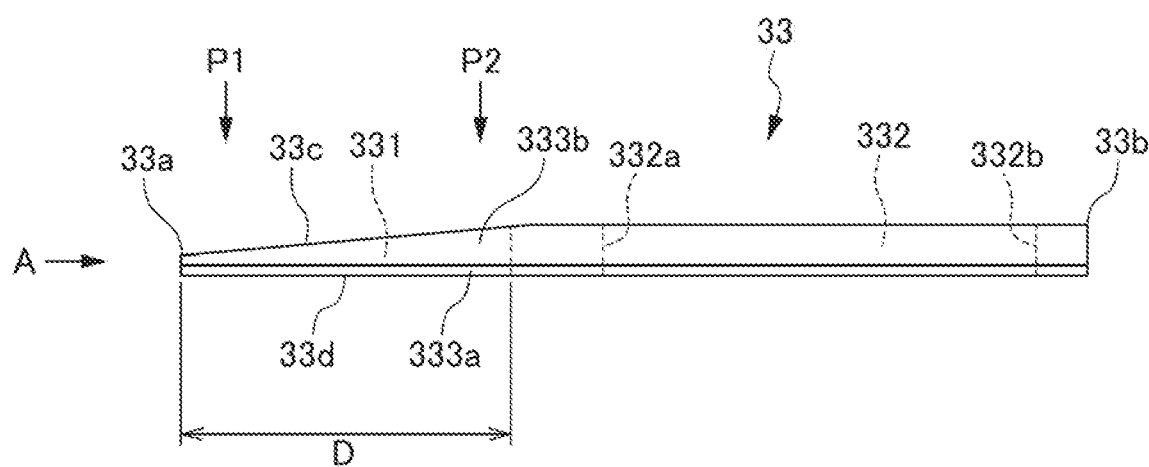
FIG. 6 is a side view showing a cuff guide.
Figure 7:
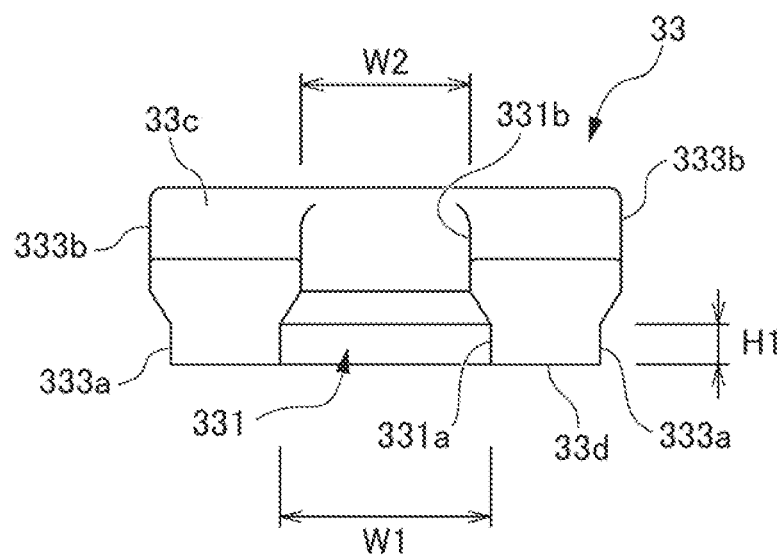
FIG. 7 is a view of the cuff guide as viewed from an A direction in FIG. 6.

As shown in FIGS. 6 and 7, the cuff guide 33 has a tapered surface 33c having a thickness gradually decreasing toward the inner end 33a located inside relative to the elongated hole 332. The tapered surface 33c is a surface opposite to a bottom surface 33d facing the end face 3a of the stator core fixing jig 3. The guide groove 331 extends over a region where the tapered surface 33c of the cuff guide 33 extends. The groove depth D of the guide groove 331 along the radial direction of the stator core 2 is equal to or larger than the depth of the slot 22 along the radial direction of the stator core 2.

As shown in FIG. 7, the guide groove 331 includes a cuff portion-supporting sub-groove 331a having a relatively large groove width along the circumferential direction of the stator core 2, and a coil-guiding sub-groove 331b having a relatively small groove width along the circumferential direction of the stator core 2. The cuff portion-supporting sub-groove 331a and the coil-guiding sub-groove 331b are continuous with each other in the thickness direction of the cuff guide 33 (in the vertical direction in FIGS. 6 and 7). The cuff portion-supporting sub-groove 331a is formed closer to the end face 2a of the stator core 2 fixed to the stator core fixing jig 3, while the coil-guiding sub-groove 331b is formed away from the end face 2a of the stator core 2 fixed to the stator core fixing jig 3.

The cuff portion-supporting sub-groove 331a is close to the bottom surface 33d facing the end face 3a of the stator core fixing jig 3 in the thickness direction of the cuff guide 33. The groove width W1 of the cuff portion-supporting sub-groove 331a along the circumferential direction of the stator core 2 is substantially equal to the width of the slot 22 along the circumferential direction of the stator core 2. The height H1 of the cuff portion-supporting sub-groove 331a along the axial direction of the stator core 2 is equal to or greater than the protruding height of the cuff portion 24a protruding from the end face 2a of the stator core 2. This height H1 is constant along the length direction of the guide groove 331. When the cuff guide 33 advances toward the slot 22 of the stator core 2, the cuff portion-supporting sub-groove 331a supports sites of the pair of radial portions 241, 241 in the cuff portion 24a from both sides in the circumferential direction of the stator core 2 (see FIG. 22).

The coil-guiding sub-groove 331b is close to the tapered surface 33c in the thickness direction of the cuff guide 33, and is formed over the entire region between the cuff portion-supporting sub-groove 331a and the tapered surface 33c. The groove width W2 of the coil-guiding sub-groove 331b along the circumferential direction of the stator core 2 is smaller than the opening width of the slot 22 along the circumferential direction of the stator core 2. Therefore, the coil-guiding sub-groove 331b is formed so as to slightly protrude further toward the inside of the slot 22, in comparison with the insulating paper sheet 24 disposed in the slot 22. However, the groove width W2 of the coil-guiding sub-groove 331b is equal to or larger than the width Wc of a straight portion 102 of a belt-shaped coil 100 (to be described later) that is to be inserted into the slot 22 (see FIG. 25). Therefore, the coil-guiding sub-groove 331b does not obstruct the insertion of the straight portion 102 into the slot 22.

The stator core fixing jig 3 of the present embodiment has thirty-six cuff guides 33 per end face 3a such that the thirty-six cuff guides 33 correspond to every other slot 22 of the stator core 2. When the cuff guides 33 are moved inward in the radial direction of the stator core fixing jig 3 to be positioned at guide positions, the cuff guides 33 are arranged such that a circumferential clearance between the inner ends 33a of the adjacent cuff guides 33 coincides with the groove width W2 of the coil-guiding sub-groove 331b of the guide groove 331.

As shown in FIGS. 6 and 7, the cuff guide 33 has, on both side surfaces of the inner end 33a, cut-out portions 333a, 333a which reduce the width of the cuff guide 33 in a region near the bottom surface 33d along the length direction of the cuff guide 33. The cut-out portion 333a has the same constant height H1 as the cuff portion-supporting sub-groove 331a. As a result, when all the cuff guides 33 move inward in the radial direction to support the cuff portions 24a of the corresponding insulating paper sheets 24 from both sides (see FIG. 21), the cut-out portions 333a, 333a of the cuff guides 33, 33 adjacent to each other in the circumferential direction form cuff portion-supporting grooves each of which supports, from both sides, the cuff portion 24a of the insulating paper sheet 24 in the slot 22 between the cuff guides 33, 33 in the circumferential direction of the stator core 2, just like the cuff portion-supporting sub-grooves 331a. Further, the cuff guide 33 has overhanging portions 333b which protrude more laterally than the cut-out portions 333a are formed, on an outer surface which is closer to the tapered surface 33c than the cut-out portions 333a. As a result, a coil-guiding groove similar to the coil-guiding sub-groove 331b is formed between the overhanging portions 333b, 333b of the cuff guides 33, 33 adjacent to each other.

As shown in FIG. 5, the stator core fixing jig 3 has, on both end faces 3a, 3a, pairs of an inner diameter side restricting pin 34a and an outer diameter side restricting pin 34b such that each of the pairs corresponds to one of the cuff guides 33. The cuff guides 33 are mounted on both the end faces 3a, 3a of the stator core fixing jig 3 such that the elongated hole 332 of each cuff guide 33 has the corresponding pair of the inner and outer diameter side restriction pins 34a and 34b engaged with the inside of the elongated hole 332.

The inner diameter side restricting pin 34a comes into contact with the inner end portion 332a of the elongated hole 332 when the cuff guide 33 moves outward in the radial direction of the stator core fixing jig 3, whereby the cuff guide 33 is positioned at a non-guide position that is an outermost position in the radial direction as shown in FIG. 2. At the non-guide position, the inner end 33a of the cuff guide 33 is positioned outward with respect to the stator core insertion hole 31 in the radial direction.

The outer diameter side restricting pin 34b comes into contact with the outer end portion 332b of the elongated hole 332 when the cuff guide 33 moves inward in the radial direction of the stator core fixing jig 3, whereby the cuff guide 33 is positioned at a guide position that is an innermost position in the radial direction. At this time, the inner end 33a of the cuff guide 33 is positioned radially outside the coil winding jig 4 (see FIGS. 20 and 21).

The stator core 2 is inserted into the stator core insertion hole 31 of the stator core fixing jig 3 from either side in the axial direction. Therefore, as shown in FIG. 5, the cuff guides 33 arranged on the side opposite to the insertion side of the stator core 2 may be arranged so that the inner ends 33a of the cuff guides 33 interfere with the annular portion 21 of the stator core 2 in a state where the outer diameter side restricting pins 34b are in contact with the inner end portions 332a of the elongated holes 332. However, the inner diameter side restricting pins 34a and the outer diameter side restricting pins 34b may be configured to selectively protrude from and be recessed into the surface of the stator core fixing jig 3 by an advance-and-retreat mechanism (not shown) having an actuator such as a cylinder provided inside the stator core fixing jig 3. As a result, when the cuff guides 33 are arranged as shown in FIG. 5, the inner diameter side restricting pins 34a and the outer diameter side restricting pins 34b are recessed into the surface of the stator core fixing jig 3 as necessary, whereby the cuff guides 33 can be further moved outward in the radial direction so that the cuff guides 33 are completely retracted from the annular portion 21 of the stator core 2 as shown in FIG. 2.

Figure 8:
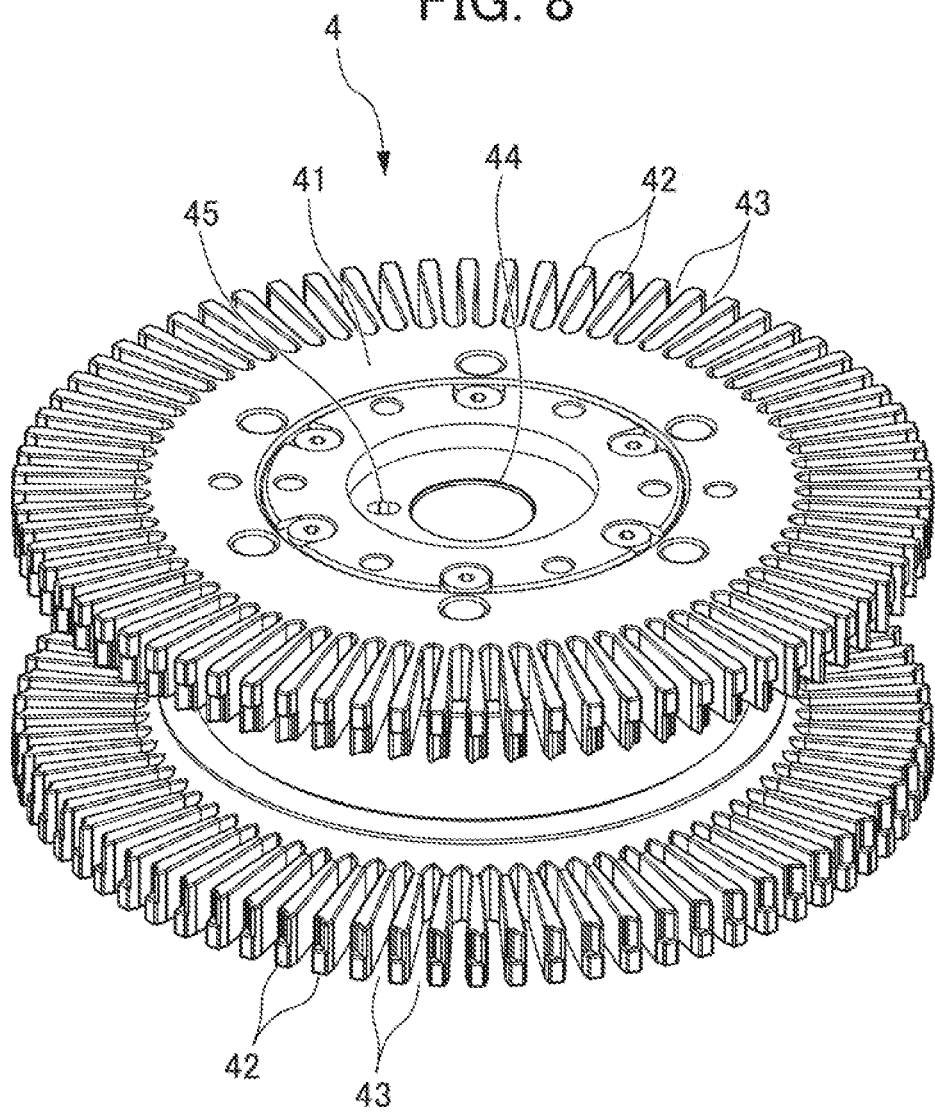
FIG. 8 is a perspective view showing the coil winding jig.

As shown in FIG. 8, the coil winding jig 4 includes a substantially cylindrical jig body 41, a plurality of comb teeth 42 protruding radially from the outer periphery of the jig body 41, a plurality of inter-comb-teeth grooves 43 formed by the gaps between the comb teeth 42 adjacent in the circumferential direction, and a shaft hole 44 that opens in the center of the jig body 41.

The comb teeth 42 and the inter-comb-teeth grooves 43 are provided at both axial end portions of the jig body 41. The phases of the comb teeth 42 and the inter-comb-teeth grooves 43 at both the axial end portions of the jig body 41 are aligned in the axial direction. The number of inter-comb-teeth grooves 43 arranged in the circumferential direction of the jig body 41 is the same as the number of slots 22 provided in the stator core 2. Therefore, the coil winding jig 4 of the present embodiment has seventy-two inter-comb-teeth grooves 43. The coil winding jig 4 is configured so that the outer diameter of the coil winding jig 4 defined by the positions of the tips of the comb teeth 42 is smaller than the inner diameter of the stator core 2, whereby the coil winding jig 4 is insertable into the annular portion 21 of the stator core 2.

Figure 9:
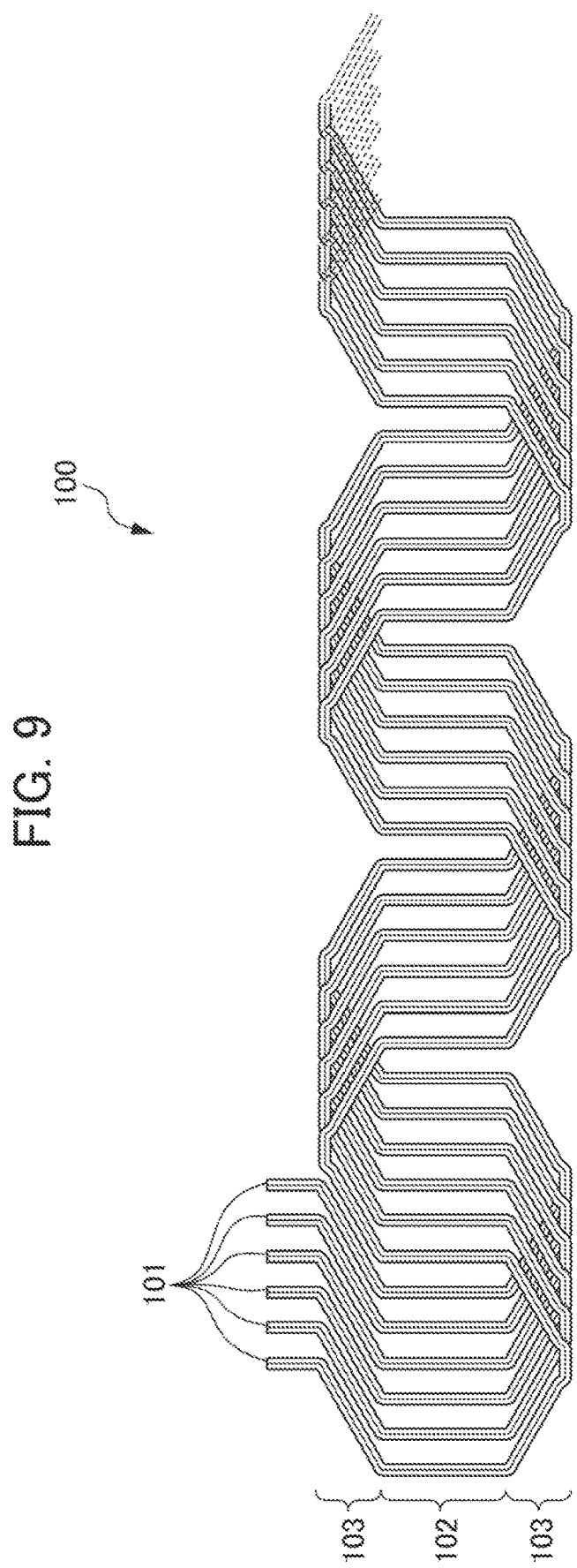
FIG. 9 is a front view showing the belt-shaped coil.

A belt-shaped coil 100 to be mounted in the stator core 2 is wound around the coil winding jig 4 in an annular shape. As shown in FIG. 9, the belt-shaped coil 100 is an elongated belt-shaped coil which includes flat conducting wires 101 having a substantially rectangular cross-sectional shape. The flat conducting wire 101 includes a highly conductive metal, such as copper or aluminum.

The belt-shaped coil 100 has a plurality of straight portions 102 and a plurality of coil end portions 103. The straight portions 102 are sites to be inserted into the slots 22 of the stator core 2, and they extend substantially linearly and are arranged in parallel at regular intervals. The coil end portions 103 are arranged at positions closer to the side ends of the belt-shaped coil 100 than the straight portions 102, and alternately connect end portions of adjacent straight portions 102 to each other and the opposite end portions of the adjacent straight portions 102 to each other in a substantially triangular chevron-like shape. The coil end portions 103 are sites which are arranged so as to protrude from the slots 22 in the axial direction of the stator core 2 when the belt-shaped coil 100 is mounted in the slots 22 of the stator core 2. The belt-shaped coil 100 of the present embodiment is formed in an elongated belt-shape by bundling six flat conducting wires 101 each of which is bent to have the plurality of straight portions 102 and the plurality of coil end portions 103, so that the straight portions 102 are arranged side by side in parallel at regular intervals.

Figure 10:
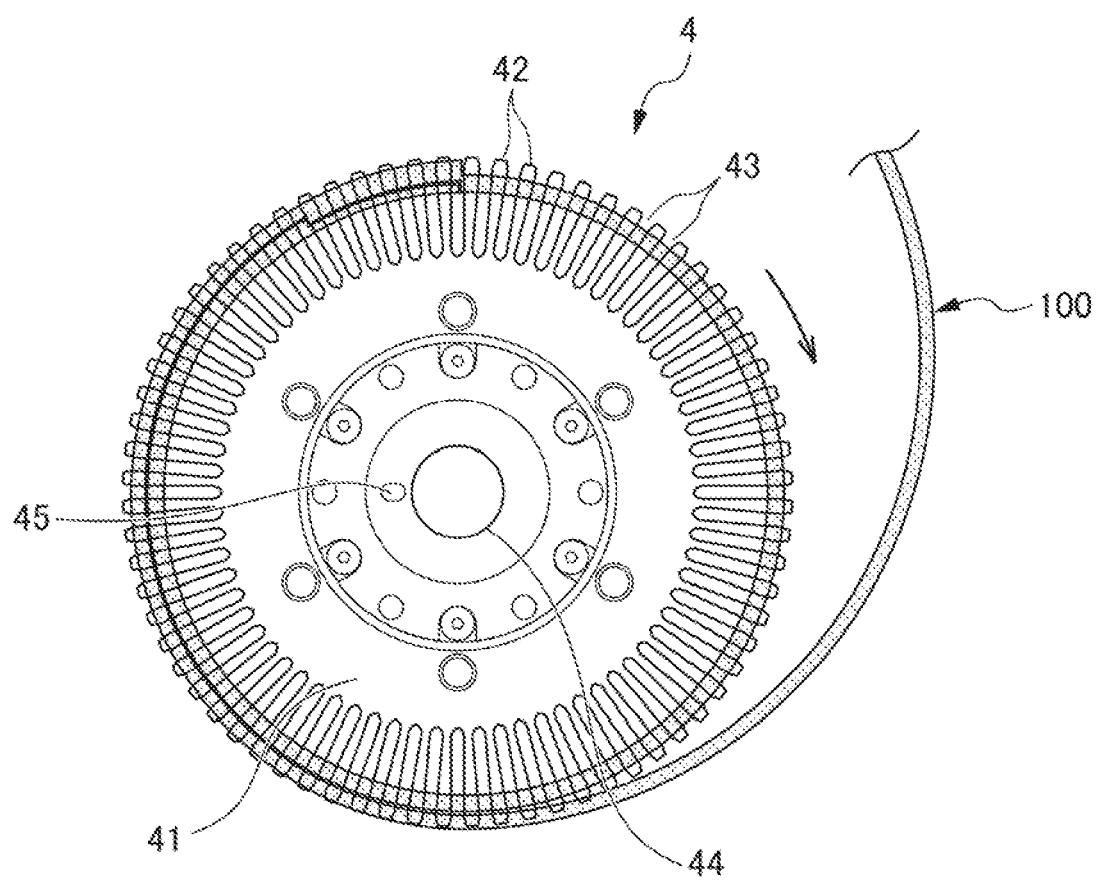
FIG. 10 is a plan view showing a state in which a belt-shaped coil is wound around a coil winding jig.
Figure 11:
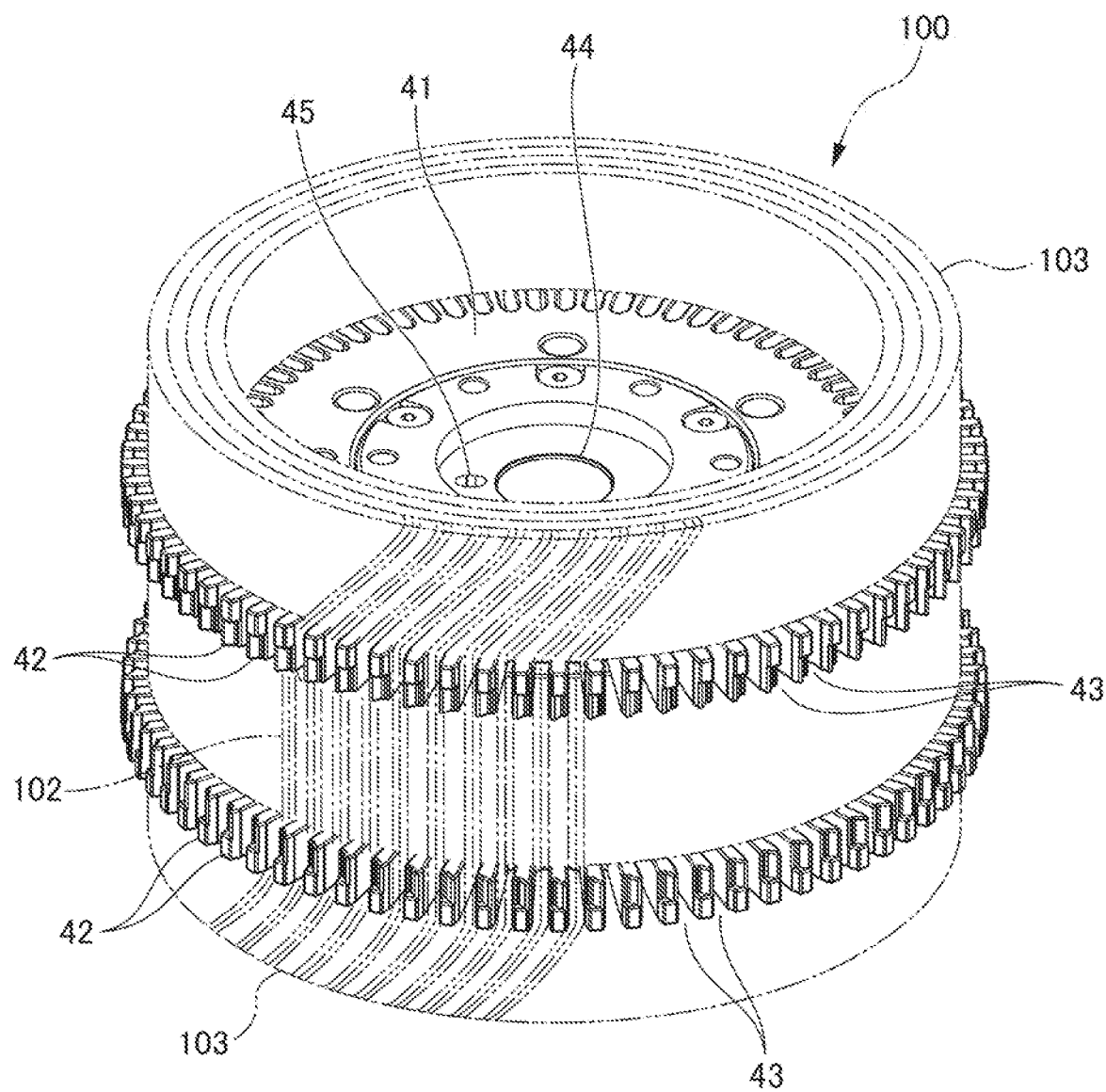
FIG. 11 is a perspective view showing the coil winding jig by which the belt-shaped coil has been wound.

As shown in FIG. 10, before the coil winding jig 4 is inserted inside the stator core 2, the straight portions 102 of the belt-shaped coil 100 are sequentially inserted into the inter-comb-teeth grooves 43 from outside, whereby the coil winding jig 4 has thereon the belt-shaped coil 100 wound by multiple turns. As a result, as shown in FIG. 11, the coil winding jig 4 on which the belt-shaped coil 100 is wound in an annular shape is prepared (coil winding step).

The distance between the comb teeth 42 in the axial direction of the jig body 41 corresponds to the length of the straight portion 102 of the belt-shaped coil 100. Therefore, the straight portions 102 of the belt-shaped coil 100 wound around the coil winding jig 4 are each received to fully extend between two comb-shaped grooves 43, 43 that coincide in phase with each other and are respectively located at one end and the other end of the jig body 41. The coil end portions 103 of the belt-shaped coil 100 wound by multiple turns protrude from the inter-comb-teeth grooves 43 in the axial direction of the jig body 41 so as to form cylindrically shapes. As shown in FIGS. 1, 2, and 3, the coil winding jig 4 having thereon the belt-shaped coil 100 wound in an annular shape as described above is inserted into the through-hole 20 of the stator core 2 fixed to the stator core fixing jig 3 by for example, a motion of a robot (not shown). FIG. 1 does not illustrate the belt-shaped coil 100 of the coil winding jig 4.

The coil winding jig 4 inserted in the through-hole 20 inside the stator core 2 is held at a predetermined position and in a predetermined posture by the coil expansion mechanisms 5 that are arranged on both sides of the stator core fixing jig 3 with the stator core fixing jig 3 interposed therebetween. Each of the coil expansion mechanisms 5 is a coil expansion device. As shown in FIG. 1, the coil expansion mechanisms 5 of the present embodiment have a substantially cylindrical appearance shape, and face, in the axial direction, the coil winding jig 4 inserted inside the stator core 2.

Figure 12:
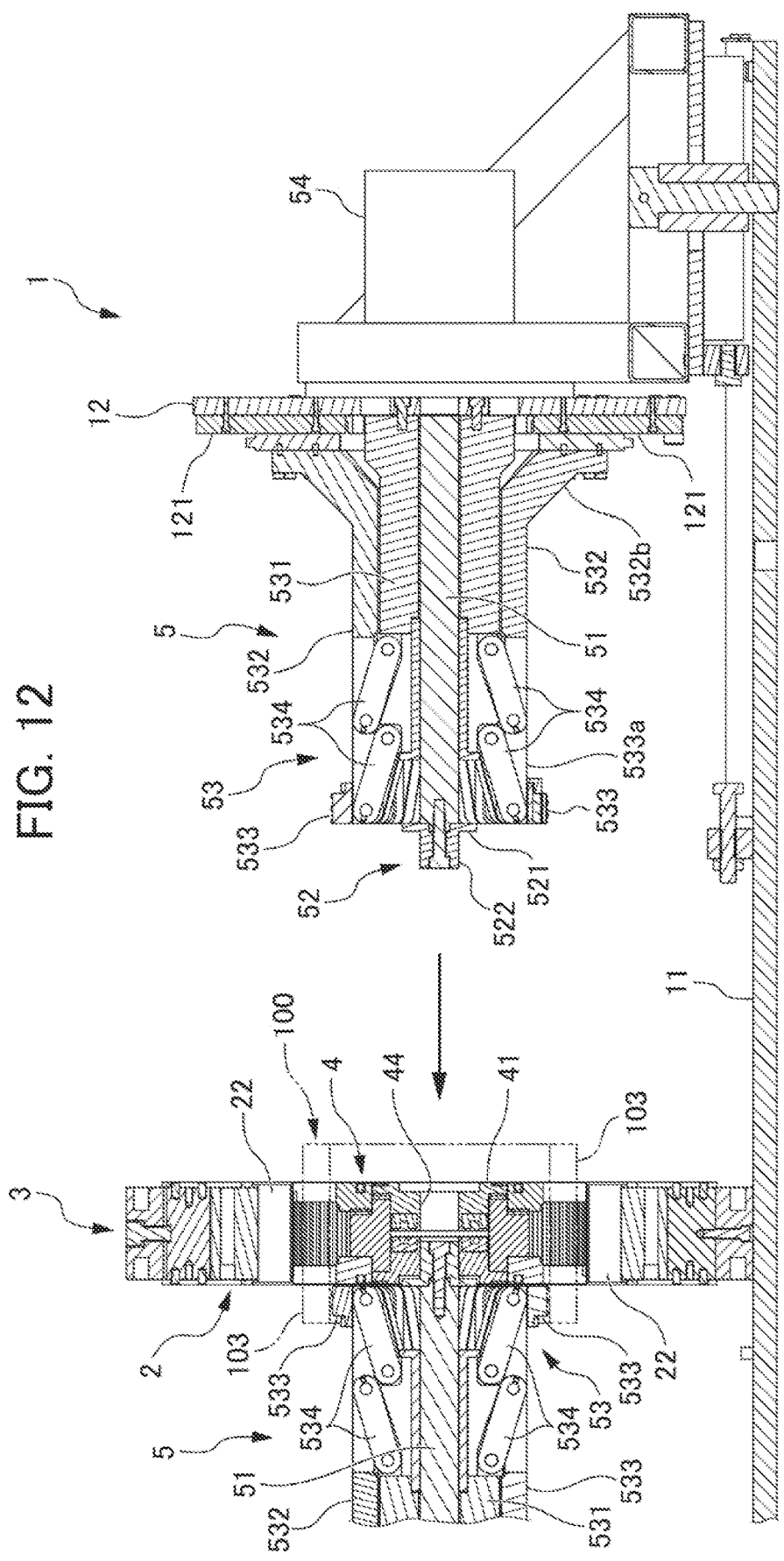
FIG. 12 is a cross-sectional side view showing a state where coil expansion mechanism is mounted on the coil winding jig inserted in the stator core.

As shown in FIGS. 1 and 12, the coil mounting apparatus 1 include a pair of support substrates 12, 12 standing on the base 11 that fixes the positioning jig 3, so that they face each other with the positioning jig 3 disposed therebetween. Each of the coil expansion mechanisms 5 protrudes horizontally from the support board 12 toward the coil winding jig 4 inserted inside the stator core 2. The coil expansion mechanisms 5 are movable in a direction in which they come into contact with the coil winding jig 4 and in a direction in which they separate from the coil winding jig 4 when the support boards 12 are linearly moved on the base 11 by driving a motor (not shown) or the like.

Figure 13:
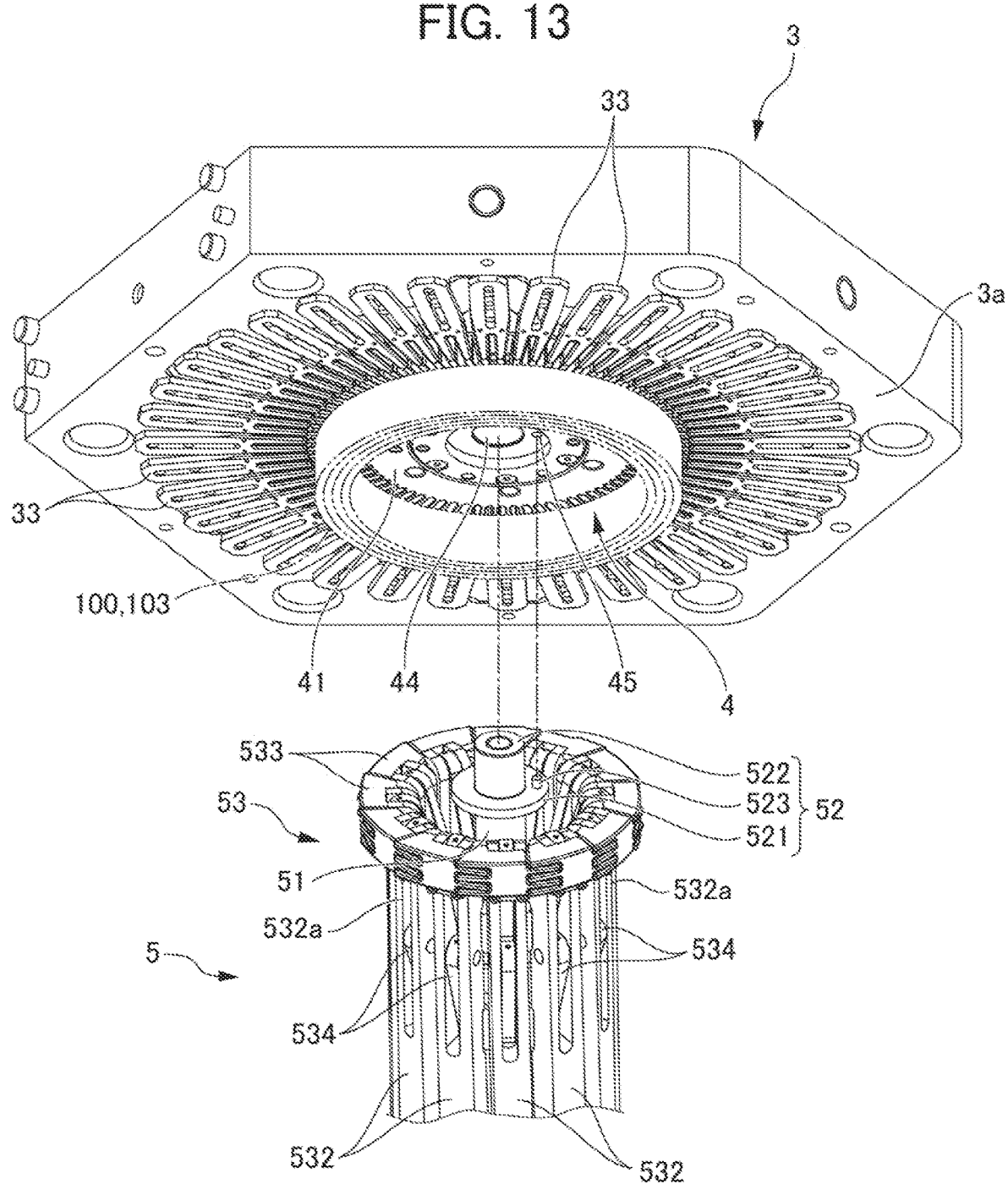
FIG. 13 is a perspective view showing the coil winding jig inserted in the stator core and a holder of the coil expansion mechanism.

As shown in FIGS. 12 and 13, the coil expansion mechanism 5 has, in the center thereof, a main shaft 51 extending from the support board 12 toward the coil winding jig 4 inserted inside the stator core 2. The main shaft 51 has, at its leading end, a holder 52 for holding the coil winding jig 4 at a predetermined position and in a predetermined posture inside the stator core 2. The holder 52 has a circular end plate 521 disposed at the leading end of the main shaft 51, a shaft protrusion 522 protruding from the center of the circular end plate 521, and one positioning protrusion 523 protruding in the same direction as the shaft protrusion 522 from a portion of the end plate 521 that is located radially outside with respect to the shaft protrusion 522. The shaft protrusion 522 fits into the shaft hole 44 of the coil winding jig 4. The positioning protrusion 523 fits into one positioning hole 45 provided in a portion of the coil winding jig 4 that is radially outside of the shaft hole 44.

The positioning hole 45 of the coil winding jig 4 and the positioning protrusion 523 of the holder 52 are positioned in advance so that the phase of the slots 22 of the stator core 2 to be fixed to the stator core fixing jig 3 and the phase of the inter-comb-teeth grooves 43 of the coil winding jig 4 inserted inside the stator core 2 match each other when the positioning hole 45 of the coil winding jig 4 and the positioning protrusion 523 of the holder 52 are fitted to each other. Therefore, when the coil expansion mechanism 5 is moved to the stator core fixing jig 3 and the shaft protrusion 522 and the positioning protrusion 523 of the holder 52 are fitted into the shaft hole 44 and the positioning hole 45 of the coil winding jig 4 respectively, as shown in FIG. 5, the coil winding jig 4 is held while the inter-comb-teeth grooves 43 are matched in phase with the slots 22 of the stator core 2. As a result, the inside of each slot 22 of the stator core 2 and the inside of the corresponding inter-comb-teeth groove 43 of the coil winding jig 4 communicate with each other in the radial direction.

The coil expansion mechanism 5 has a coil expander 53 surrounding the outer periphery of the main shaft 51. The coil expander 53 includes a movable cylinder 531 that fits onto the outer periphery of the main shaft 51, a plurality of movable arms 532 that are arranged further outside the movable cylinder 531, and a plurality of piece members 533 provided at the tips of the movable arms 532 on a one-to-one basis.

The movable cylinder 531 is smaller in length than the main shaft 51, and is slidable in the axial direction of the main shaft 51 by driving an actuator 54, such as a cylinder, arranged behind the support board 12.

The plurality of movable arms 532 extend in the axial direction of the main shaft 51, and are arranged around the outer periphery of the movable cylinder 531 at regular intervals in the circumferential direction. The coil expander 53 of the present embodiment has twelve movable arms 532 arranged along the circumferential direction of the main shaft 51. The support board 12 has, on its surface, twelve guide rails 121 extending radially outward and arranged in the radial direction with the main shaft 51 centered. Rear ends 532b of the movable arms 532 are attached so as to be movable along the guide rails 121. The movable arms 532 bend from the guide rails along the axial direction of the movable cylinder 531 and extend to the vicinity of the outer periphery of the holder 52. The tips 532a of the movable arms 532 are connected to the outer peripheral surface on the tip portion of the movable cylinder 531 via every two link portions 534 which are rotatably attached.

Figure 15:
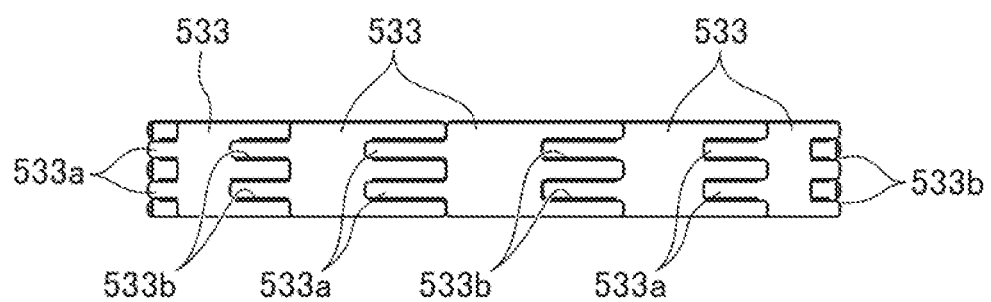
FIG. 15 is a side view showing a coil expander of the coil expansion mechanism in a diameter-reduced state.
Figure 16:
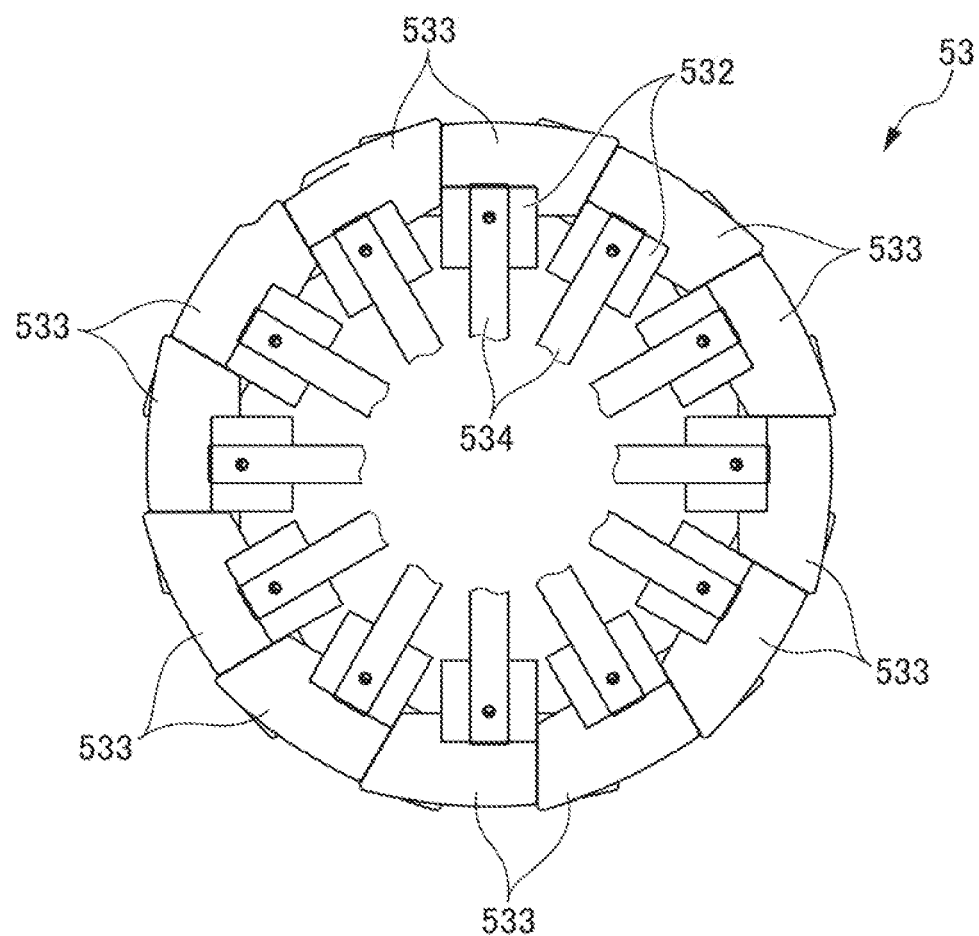
FIG. 16 is a front view showing the coil expander of the coil expansion mechanism in a diameter-reduced state.

The piece members 533 have a substantially fan shape, and are provided to the tips of the movable arms 532 on a one-to-one basis. Therefore, the coil expander 53 of the present embodiment has twelve piece members 533. As shown in FIGS. 15 and 16, each of the piece members 533 has a pair of fitting projections 533a at one end portion thereof in the circumferential direction, and also has a pair of fitting grooves 533b that are fittable to the fitting projections 533a, at the other end thereof in the circumferential direction. The pair of engagement protrusions 533a are adjacent in the axial direction of the coil expansion portion 53, and protrudes in parallel toward the circumferential direction of the coil expansion portion 533. The twelve piece members 533 are annularly arranged around the outer periphery of the holder 52 in such a manner that adjacent piece members 533, 533 engage with each other via the pair of fitting projections and the pair of fitting grooves 533b thereof.

Figure 14:
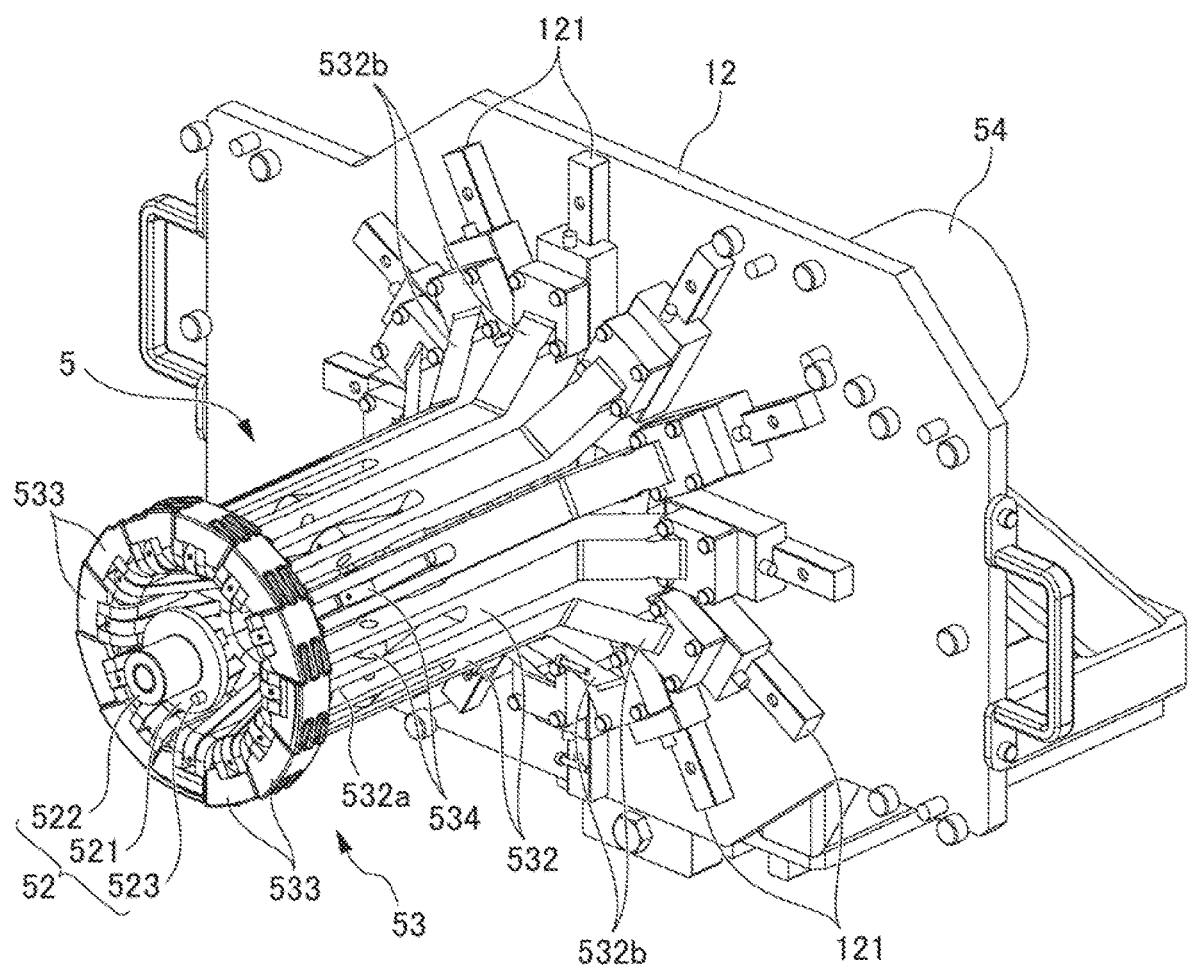
FIG. 14 is a perspective view showing the coil expansion mechanism in a diameter-reduced state.

The coil expander 53 of the coil expansion mechanism 5 shown in FIGS. 12, 13 and 14 is in a state in which the movable cylinder 531 is retracted toward the rear end of the main shaft 51 (toward the support board 12). At this time, the movable arms 532 move toward the inner ends of the radial guide rails 121, and are positioned closest to the outer peripheral surface of the movable cylinder 531. As a result, as shown in FIGS. 15 and 16, the coil expander 53 is minimized in diameter so that the twelve piece members 533 are brought into tight contact with one another. When minimized, the outer diameter of the coil expander 53 is slightly smaller than the inner diameter of the cylindrical shape formed by the coil end portion 103 protruding in the axial direction from the coil winding jig 4 having the belt-shaped coil 100 wound therearound. While the coil expander 53 is reduced in diameter, the coil expansion mechanism 5 is inserted inside the coil end portions 103, which form the cylindrical shape by protruding in the axial direction of the coil winding jig 4, and holds the coil winding jig 4 by the holder 52.

Figure 17:
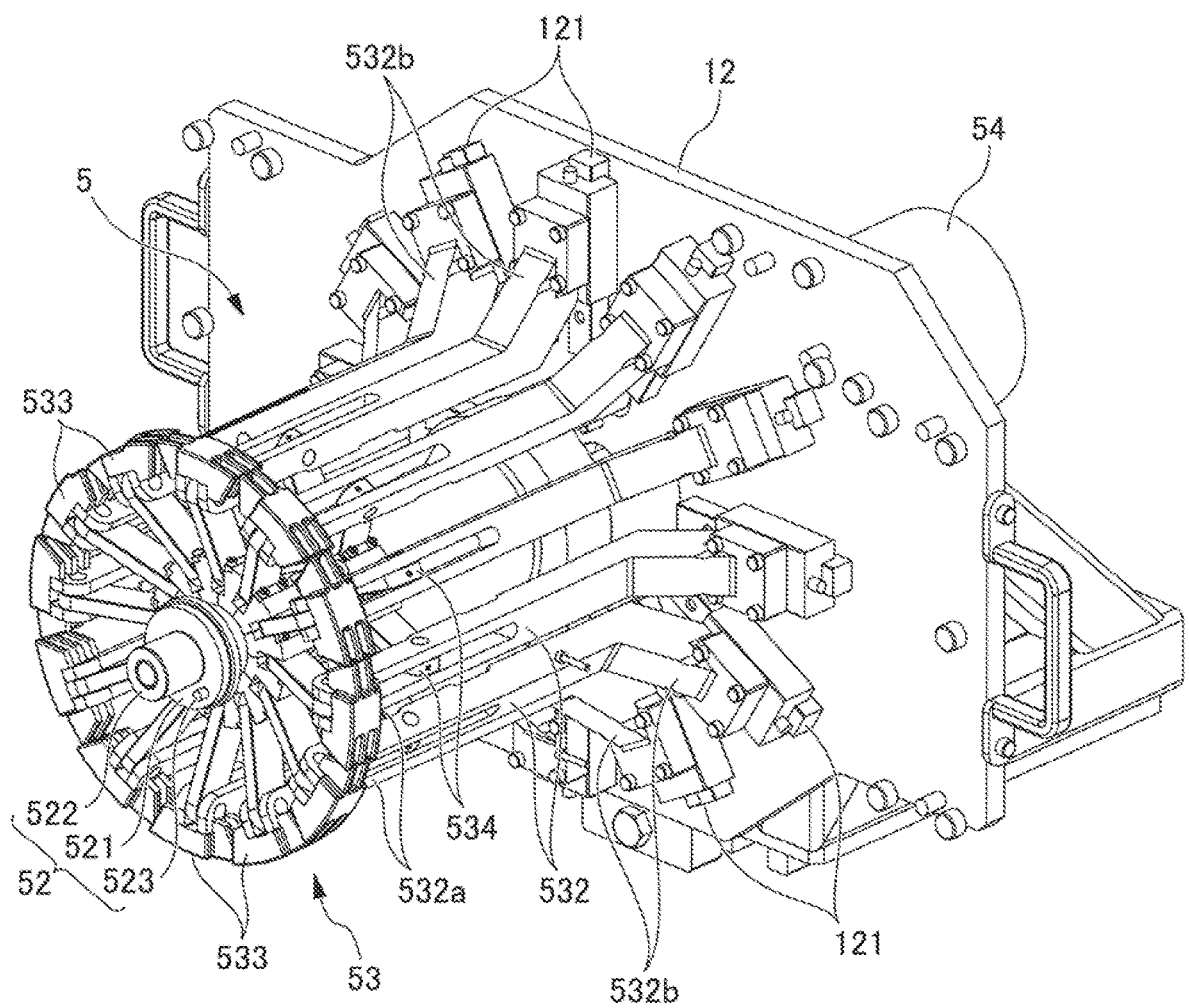
FIG. 17 is a perspective view showing the coil expansion mechanism in a diameter-increased state.
Figure 18:
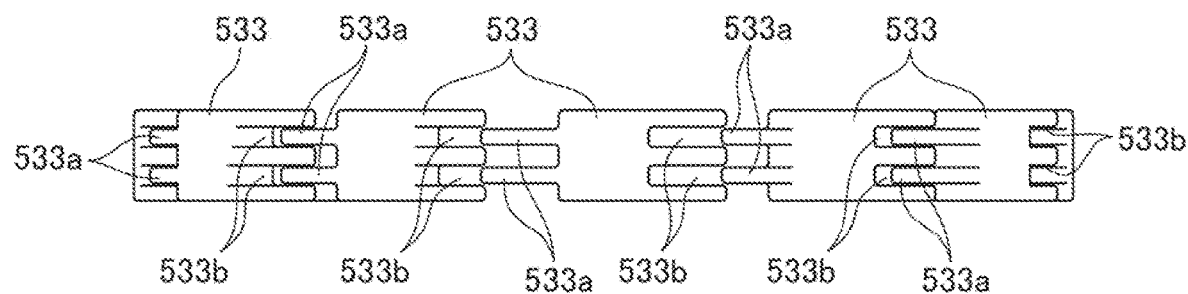
FIG. 18 is a side view showing the coil expander of the coil expansion mechanism in the diameter-increased state.
Figure 19:
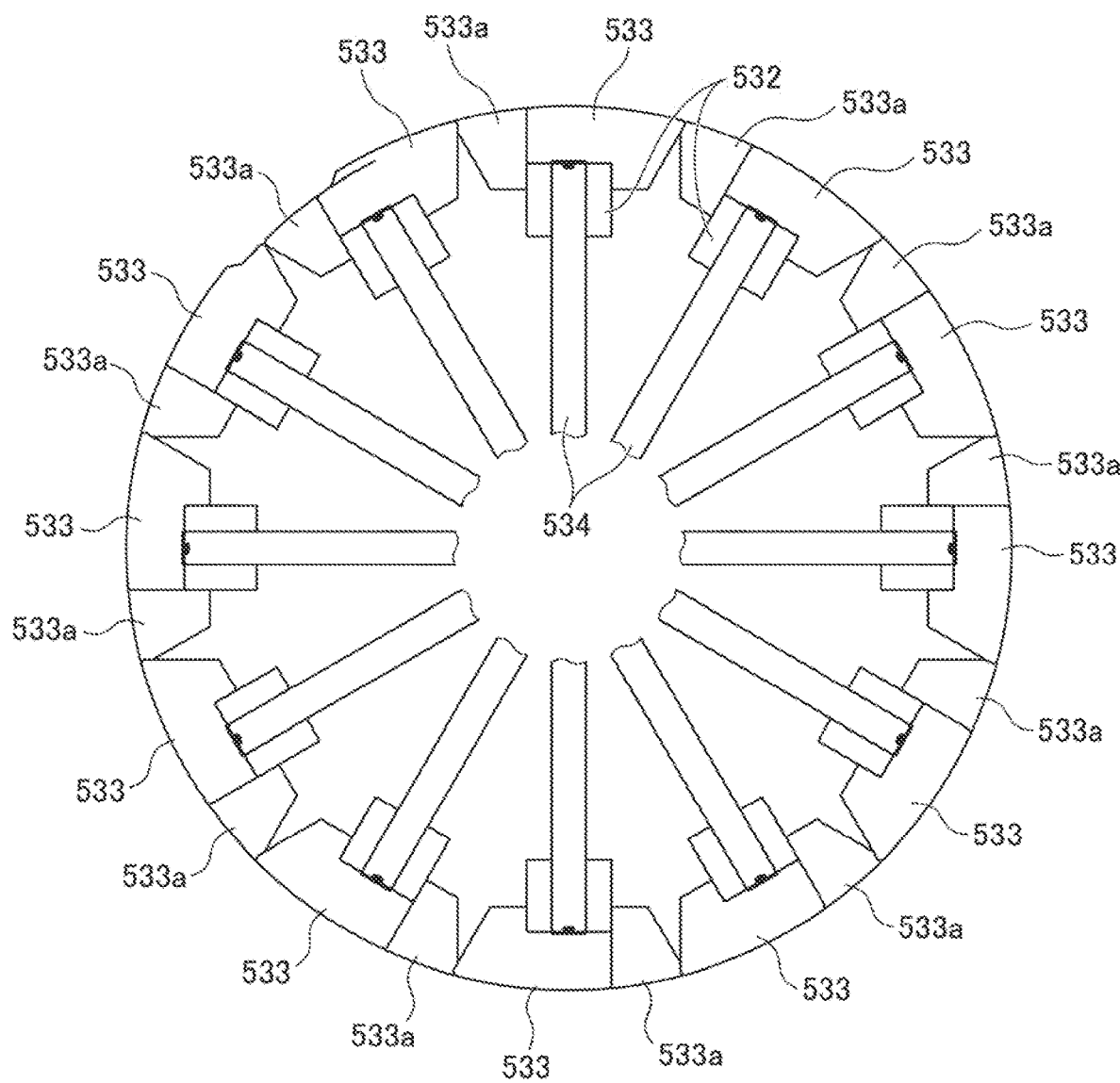
FIG. 19 is a front view showing the coil expander of the coil expansion mechanism in the diameter-increased state.

Next, when the movable cylinder 531 advances toward the coil winding jig 4 along the main shaft 51 by driving the actuator 54, the link portions 534 connected to the movable cylinder 531 are turned so as to protrude radially outward with respect to the movable cylinder 531, thereby translating the movable arms 532 outwardly along the guide rails. As a result, the twelve movable arms 532 are separated radially outward from the movable cylinder 531. At this time, as shown in FIGS. 17, 18, and 19, the coil expander 53 expands in diameter by moving the piece members 533 so that the distance between the adjacent piece members 533 increases. When maximized, the outer diameter of the coil expander 53 is slightly larger than the outer diameter of the coil winding jig 4.

As shown in FIGS. 18 and 19, when the coil expander 53 is expanded most in diameter, the adjacent piece members 533 and 533 are separated from each other, while the pairs of fitting projections 533a separated from the fitting grooves 533b protrude in the circumferential direction between the respective piece members 533. Therefore, when the coil expander 53 is viewed in the circumferential direction, the adjacent piece members 533, 533 are continuous with each other via the pair of fitting projections 533a, and such a groove portion as to penetrate through the coil expander 53 in the radial direction is not formed.

Next, a method for inserting the belt-shaped coil 100 wound around the coil winding jig 4 into the slots 22 from the inside of the stator core 2 fixed to the stator core fixing jig 3, while using the coil mounting apparatus 1 will be described.

Figure 20:
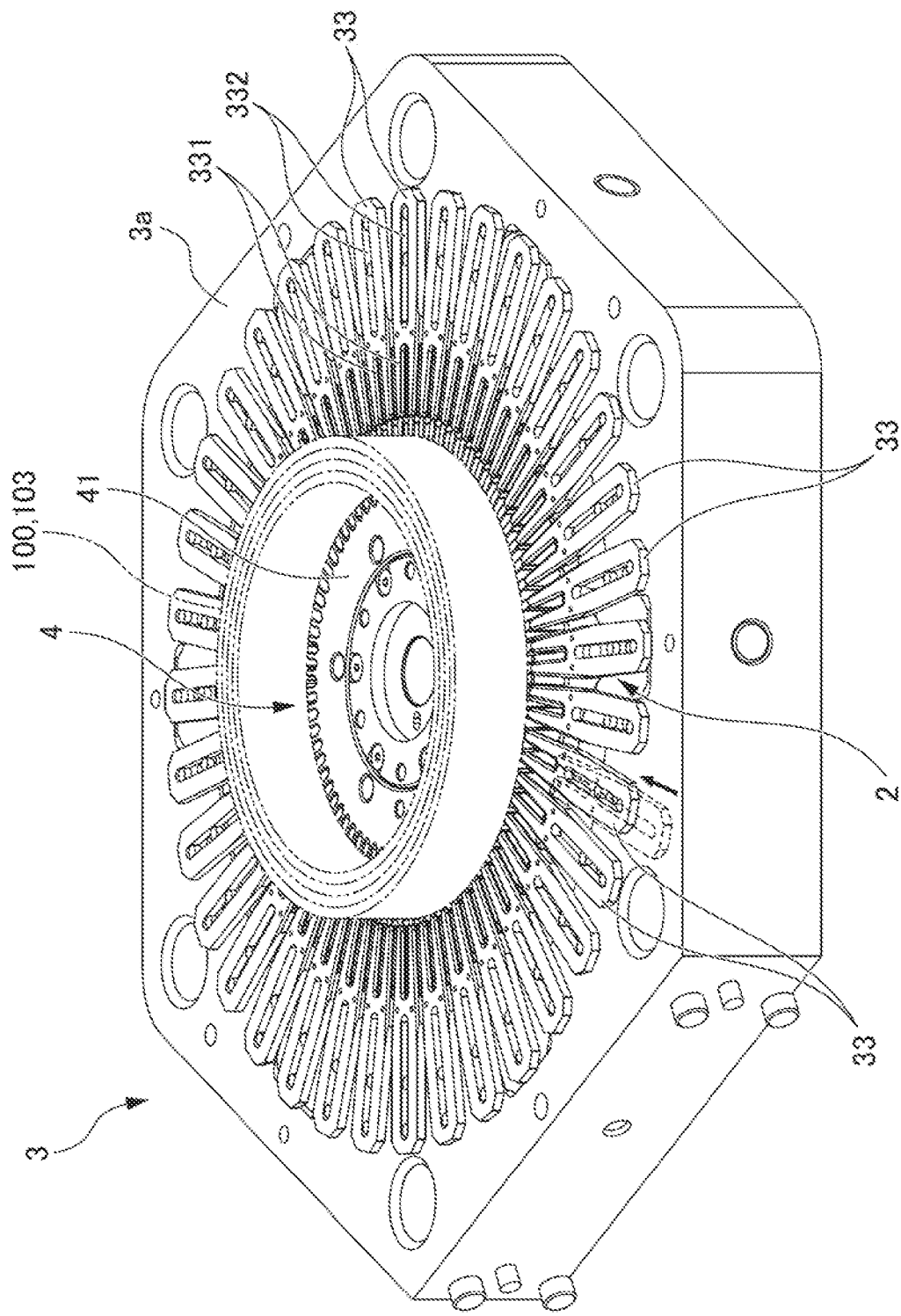
FIG. 20 is a perspective view showing a state in which the insulating paper sheets in the slots of the stator core are supported by cuff guides.

Before insertion of the coil winding jig 4 into the stator core 2, the coil winding step described above is performed so that the belt-shaped coil 100 is annularly wound around the coil winding jig 4. After the coil winding jig 4 having the belt-shaped coil 100 annularly wound therearound is inserted in the stator core 2 fixed to the stator core fixing jig 3, the cuff guides 33 are moved inwardly in the radial direction by driving an actuator (not shown), as shown in FIG. 20.

Figure 21:
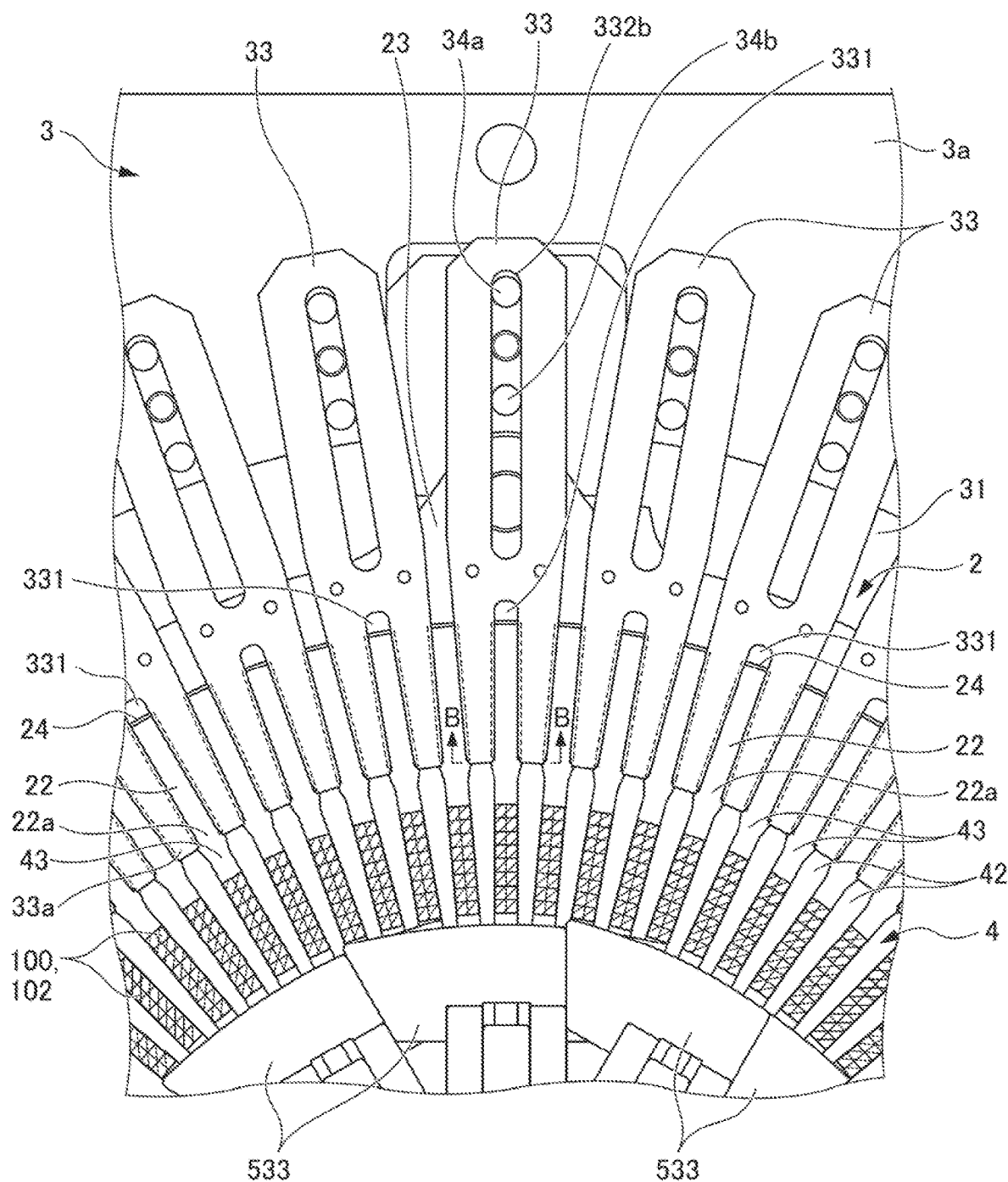
FIG. 21 is a partially enlarged view showing a state in which the insulating paper sheets in the slots of the stator core are supported by the cuff guides.

In a state where the cuff guides 33 have been moved inward in the radial direction, as shown in FIG. 21, the guide grooves 331 of the cuff guides 33 support the cuff portions 24a of the insulating paper sheets 24 in the corresponding slots 22 from both sides in the circumferential direction.

Figure 22:
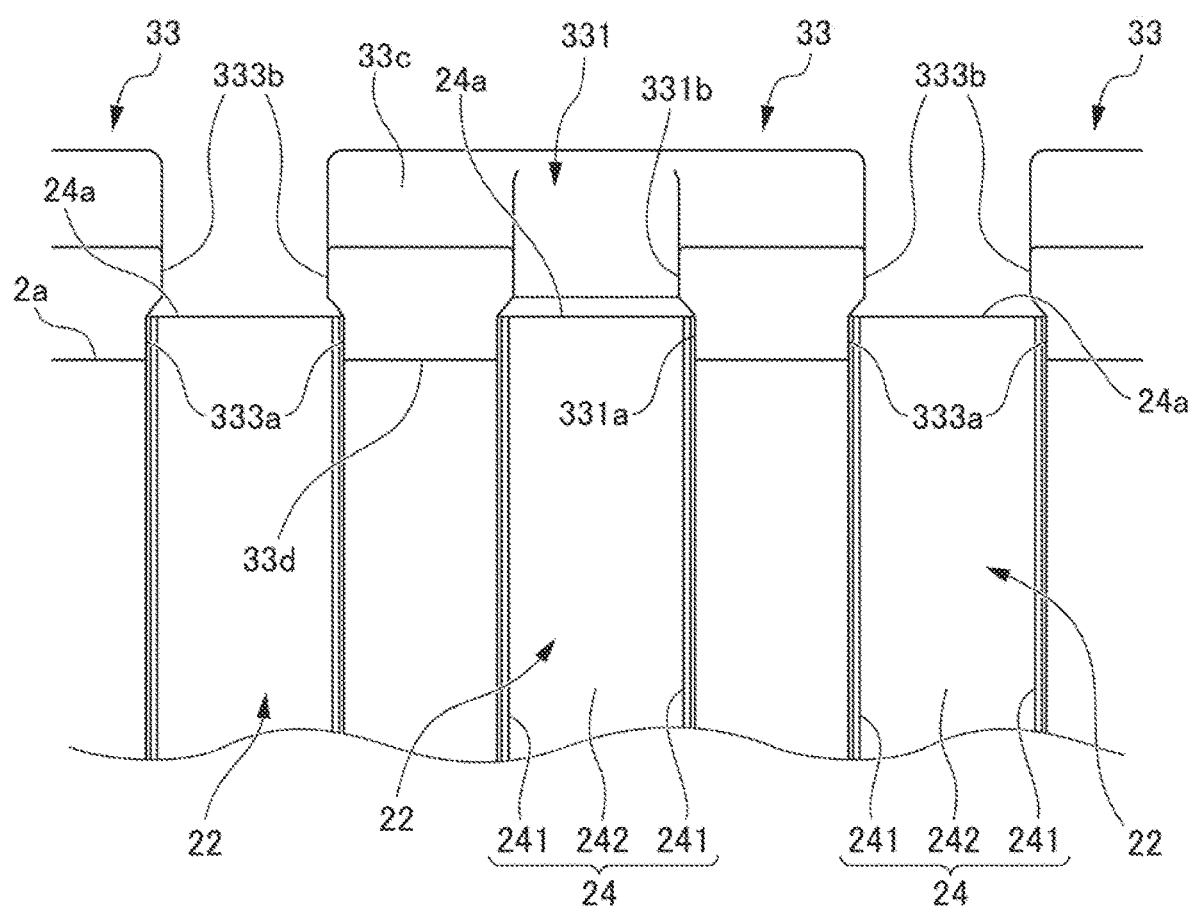
FIG. 22 is a diagram showing a state in which the stator core is viewed along a line B-B in FIG. 21.

Specifically, as shown in FIG. 22, the cuff portion-supporting sub-grooves 331a of the guide grooves 331 each support the pair of radial portions 241, 241 of the corresponding cuff portion 24a from both sides. The coil-guiding sub-grooves 331b of the guide grooves 331, which are arranged outside with respect to the cuff portions 24a in the axial direction of the stator core 2 (above on the page of FIG. 22), cover and conceal the cuff portions 24a.

At this time, the cuff portion-supporting grooves are formed by the cut-out portions 333a, 333a of the cuff guides 33, 33 adjacent in the circumferential direction. These cuff portion-supporting grooves also support the cuff portions 24a of the insulating paper sheets 24 of the slots 22 between the cuff guides 33, 33 from both sides in the circumferential direction. Further, the overhanging portions 333b, 333b of the cuff guides 33, 33 are arranged so as to cover and conceal the cuff portions 24a. In this way, the cuff portions 24a of all the insulating paper sheets 24 in the slots 22 are supported by the cuff portion-supporting sub-grooves 331a and the cut-out portions 333a of the cuff guides 33, so that all the pieces of insulating paper 24 are positioned at predetermined positions in the slots 22.

Although the coil expansion mechanism 5 that holds the coil winding jig 4 is not shown in FIG. 20, the operation that causes the cuff guides 33 to support the cuff portions 24a is performed at an appropriate timing after the stator core 2 is fixed to the stator core fixing jig 3 and before the belt-shaped coil 100 is inserted into the slots 22 of the stator core 2 by way of an operation of the coil expander 53, as will be described later.

Each coil expansion mechanism 5 having the coil expander 53 reduced in diameter moves toward the coil winding jig 4, whereby the coil winding jig 4 inserted inside the stator core 2 is held by the holder 52 of the coil expansion mechanism 5 (coil winding jig holding step).

Figure 23:
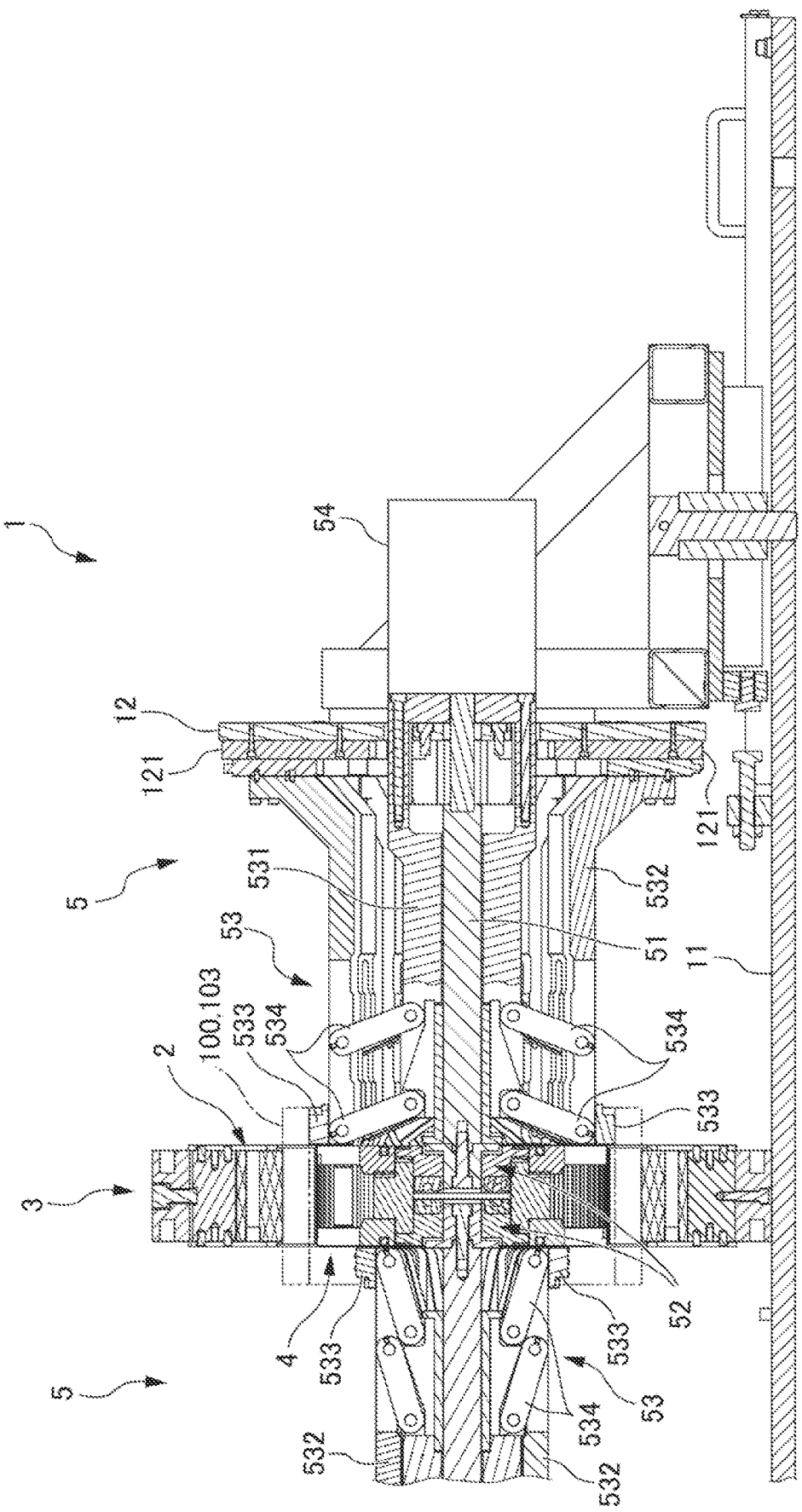
FIG. 23 is a cross-sectional side view showing an aspect in which a belt-shaped coil of a coil winding jig fixed to a stator core fixing jig is expanded by the coil expansion mechanism.
Figure 24:
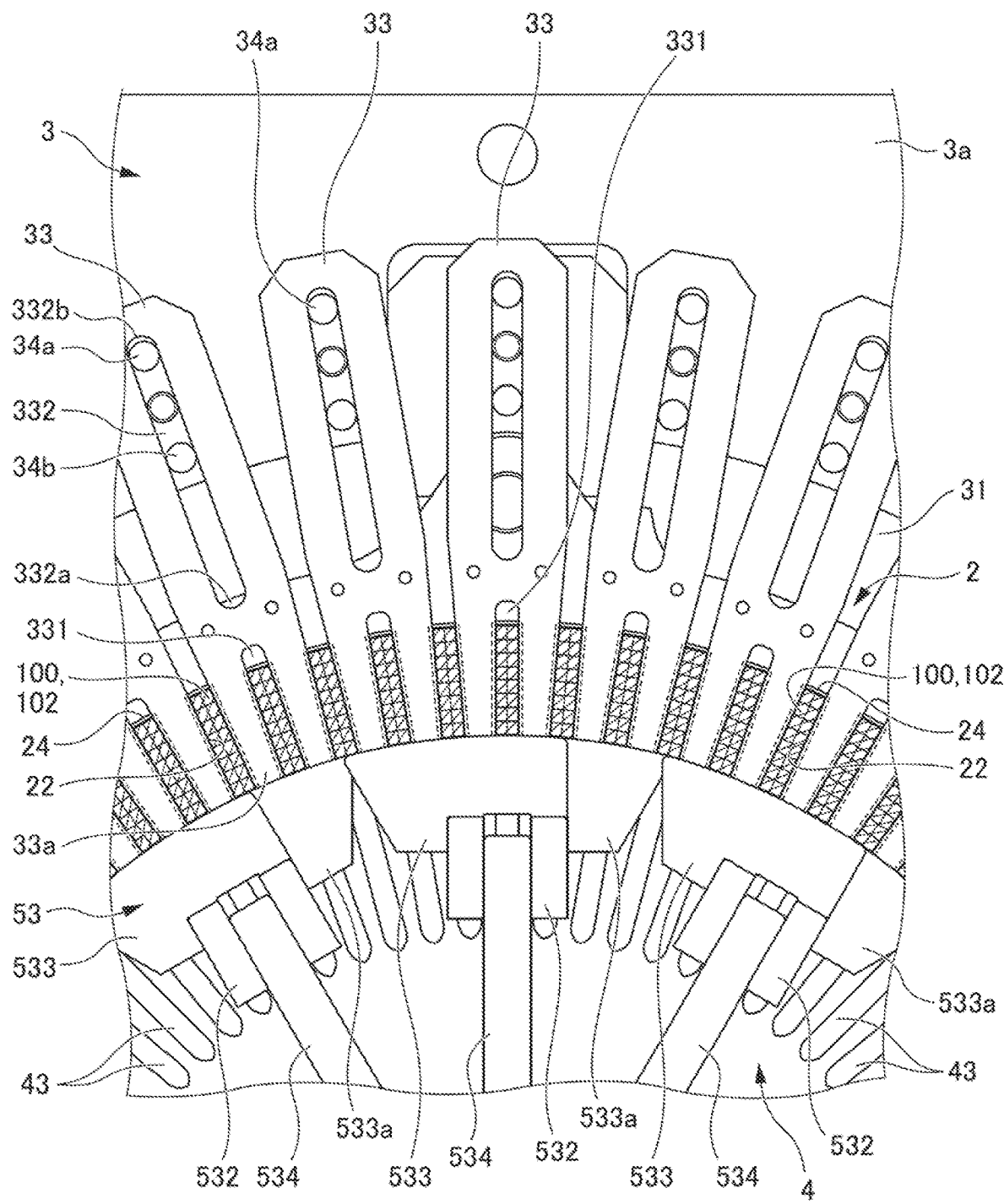
FIG. 24 is a partially enlarged view showing a state in which the belt-shaped coil pressed by the coil expansion mechanism is inserted into the slots of the stator core.

Further, after the cuff portions 24a of the insulating paper sheets 24 in the slots 22 are positioned by the cuff portion-supporting sub-grooves 331a of the guide grooves 331 of the cuff guides 33, as shown in FIGS. 23 and 24, the coil expander 53 of each coil expansion mechanism 5 is expanded in diameter by driving the actuator 54. As a result, the coil expanders 53 press the coil end portions 103 of the belt-shaped coil 100 wound around the coil winding jig 4 so as to expand the coil end portions 103 from inside toward outside with respect to the belt-shaped coil 100. The belt-shaped coil 100 pressed by the coil expanders 53 gradually expands. Due to this expansion, the straight portions 102 move toward the slots 22 of the stator core 2 which communicate with the inter-comb-teeth grooves 43, while being guided by the inter-comb-teeth grooves 43. As a result, the straight portions 102 of the belt-shaped coil 100 are inserted into the slots 22 of the stator core 2 through the openings 22a of the slots 22 without interfering with the slots 22 (coil expansion step).

Figure 25:
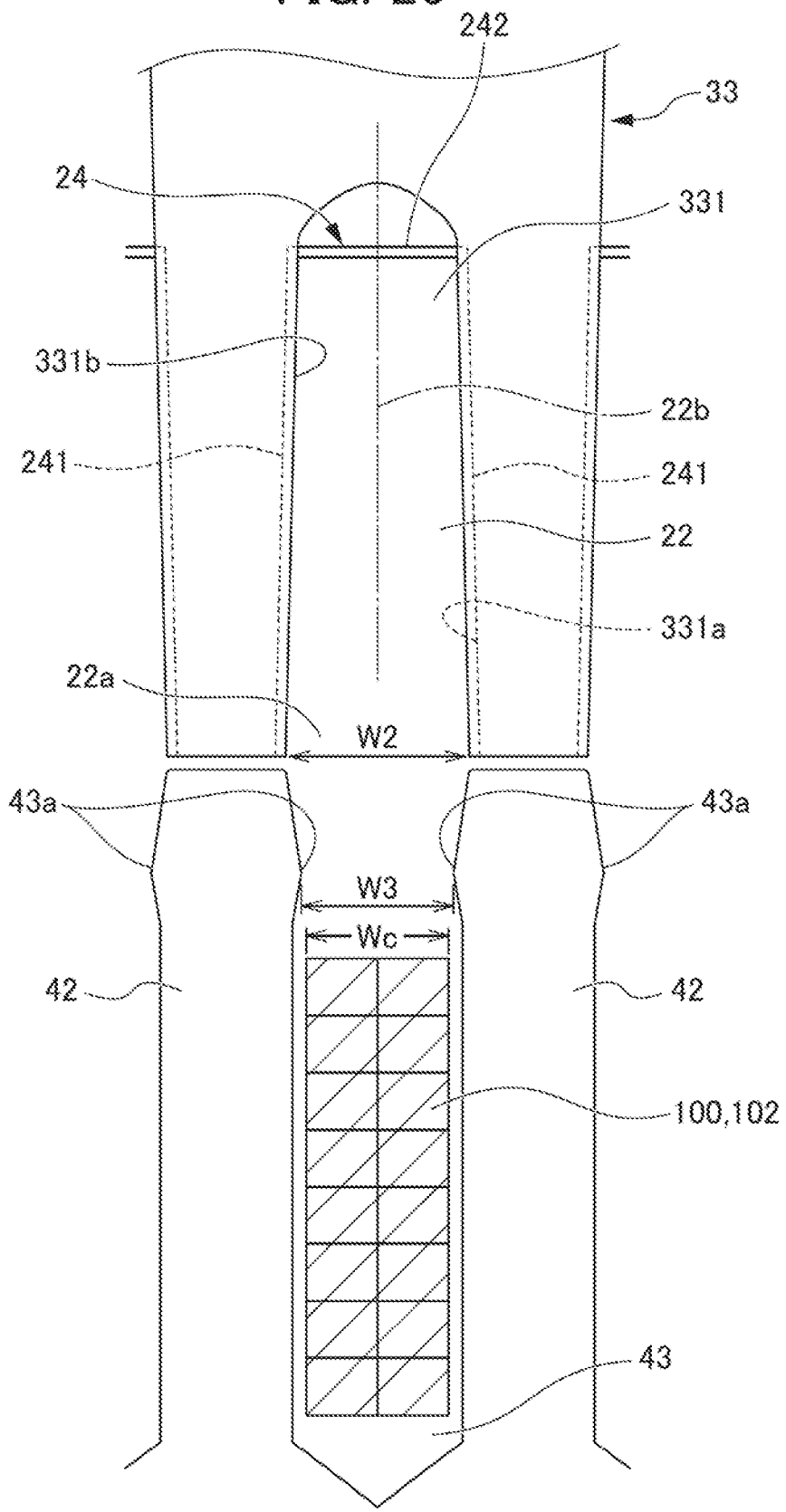
FIG. 25 is a diagram showing inter-comb-teeth grooves of the coil winding jig and guide grooves of the cuff guides.

Here, as shown in FIG. 25, the inter-comb-teeth groove 43 of the coil winding jig 4 has a narrow portion 43a in its radially outer portion. The groove width W3 of the narrow portion 43a in the circumferential direction of the coil winding jig 4 is smaller than the groove width W2 of the coil-guiding sub-groove 331b of the guide groove 331 of the cuff guide 33. However, the groove width W3 of the narrow portion 43a is substantially equal to the width We of the straight portion 102 of the belt-shaped coil 100. As a result, when the straight portions 102 in the inter-comb-teeth grooves 43 moving toward the slots 22 pass through the narrow portions 43a, each straight portion 102 undergoes position correction so as to become aligned with the slot center line 22b passing through the center of the opening 22a of the corresponding slot 22, immediately before the straight portion 102 is inserted into the corresponding slot 22. Therefore, the straight portions 102 in the inter-comb-teeth grooves 43 are smoothly received on the insulating paper sheets 24 through the openings 22a of the slots 22.

Figure 26:
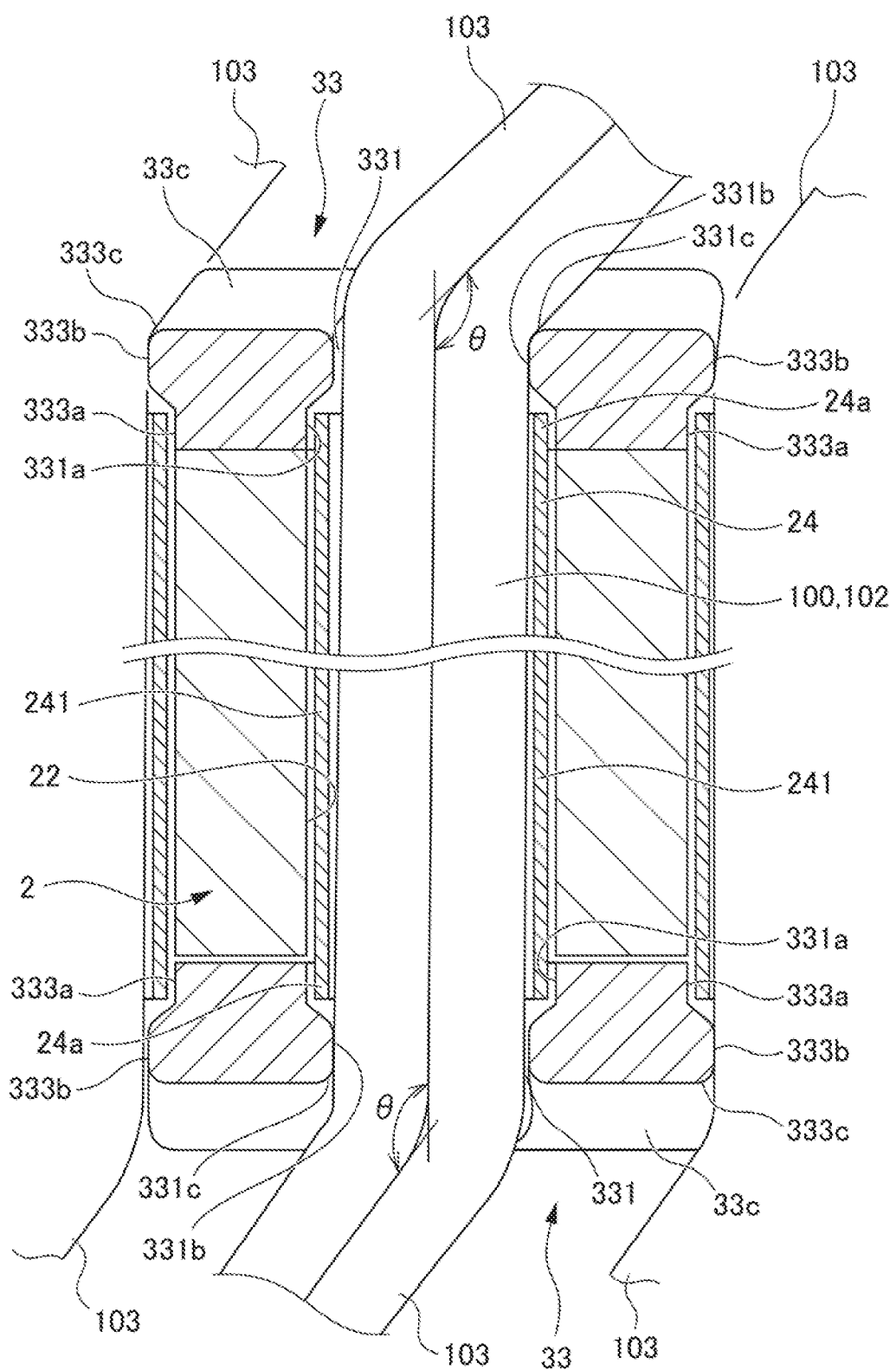
FIG. 26 is a cross-sectional view at a position P1 in FIG. 6, and showing an aspect in which a straight portion of the belt-shaped coil is guided by the guide groove of the cuff guide.

As shown in FIG. 26, each straight portion 102 passing through the opening 22a of the slot 22 moves in the slot 22 while coming into contact with the coil-guiding sub-groove 331b and the overhanging portions 333b of the guide grooves 331 of the cuff guides 33, whereby the straight portion 102 is guided along the coil-guiding sub-groove 331b and the overhanging portions 333b. Since the coil-guiding sub-groove 331b is narrower than the cuff portion-supporting sub-groove 331a, the cuff portion 24a supported by the cuff portion-supporting sub-groove 331a does not come into contact with the straight portion 102. This feature makes it possible to prevent each of cuff portions 24a of the insulating paper sheets 24 from being caught between the slot 22 and the straight portion 102 inserted into the slot 22.

Figure 27:
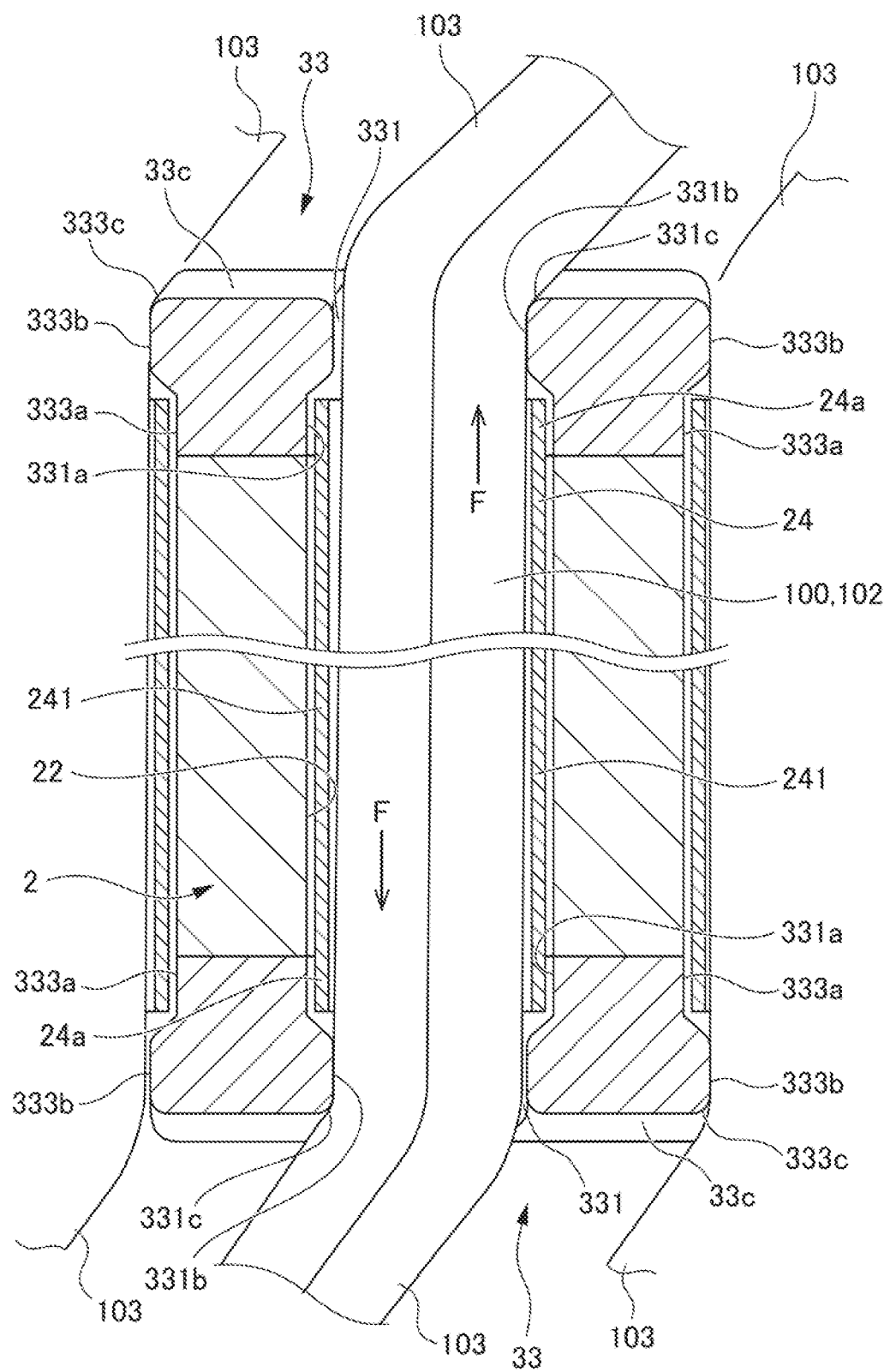
FIG. 27 is a cross-sectional view at a position P2 in FIG. 6, and showing an aspect in which the straight portion of the belt-shaped coil is guided by the guide groove of the cuff guide.

As shown in FIG. 26, in a state where the belt-shaped coil 100 has the straight portions 102 inserted into the slots 22, the coil end portions 103 of the belt-shaped coil 100 each bends and extends outward from the guide groove 331 of the cuff guide 33 and from between the adjacent cuff guides 33, 33, and are each in contact with a corner 331c between the coil-guiding sub-groove 331b of the guide groove 331 and the tapered surface 33c and a corner 333c between the overhanging portion 333b and the tapered surface 33c (the position P1 in FIG. 6). Since the belt-shaped coil 100 gradually expands in diameter as the straight portions 102 are deeply inserted into the slots 22, and the clearance between the adjacent straight portions 102 in the circumferential direction increases, the belt-shaped coil 100 is deformed so that an inner angle 9 formed between the coil end portion 103 and the straight portion 102 gradually increases. At this time, a stress which causes the straight portion 102 in the slot 22 to curve in the circumferential direction of the stator core 2 acts on the straight portion 102 in the slot 22. If the straight portion 102 curves in the slot 22, the straight portion 102 may come into contact with the radial portion 241 of the insulating paper sheet 24 in the slot 22 to damage the insulating paper sheet 24. However, since the corners 331c and 333c of the cuff guides 33 of the present embodiment are formed along the tapered surface 33c, following deep insertion of the straight portion 102 into the slot 22, the coil end portions 103 at both the ends of the straight portion 102 apply tensions F in the axial direction of the stator core 2 (the upward and downward directions in FIG. 27) to the straight portion 102, while the corners 331c and 333c serve as fulcrums as indicated by arrows in FIG. 27. As a result, the straight portion 102 in the slot 22 is straightened, and thus when the straight portion 102 moves in the slot 22, the straight portion 102 is prevented from curving and damaging the insulating paper sheet 24.

The corners 331c and 333c of the coil-guiding sub-groove 331b of the guide groove 331 are both rounded. Therefore, even if the coil end portion 103 comes into contact with the corner 331c, a protective coating formed on the surface of the belt-shaped coil 100 is unlikely to be damaged. The entirety of coil-guiding sub-groove 331b and the entirety of overhanging portion 333b may be formed in a rounded arc shape.

Figure 28:
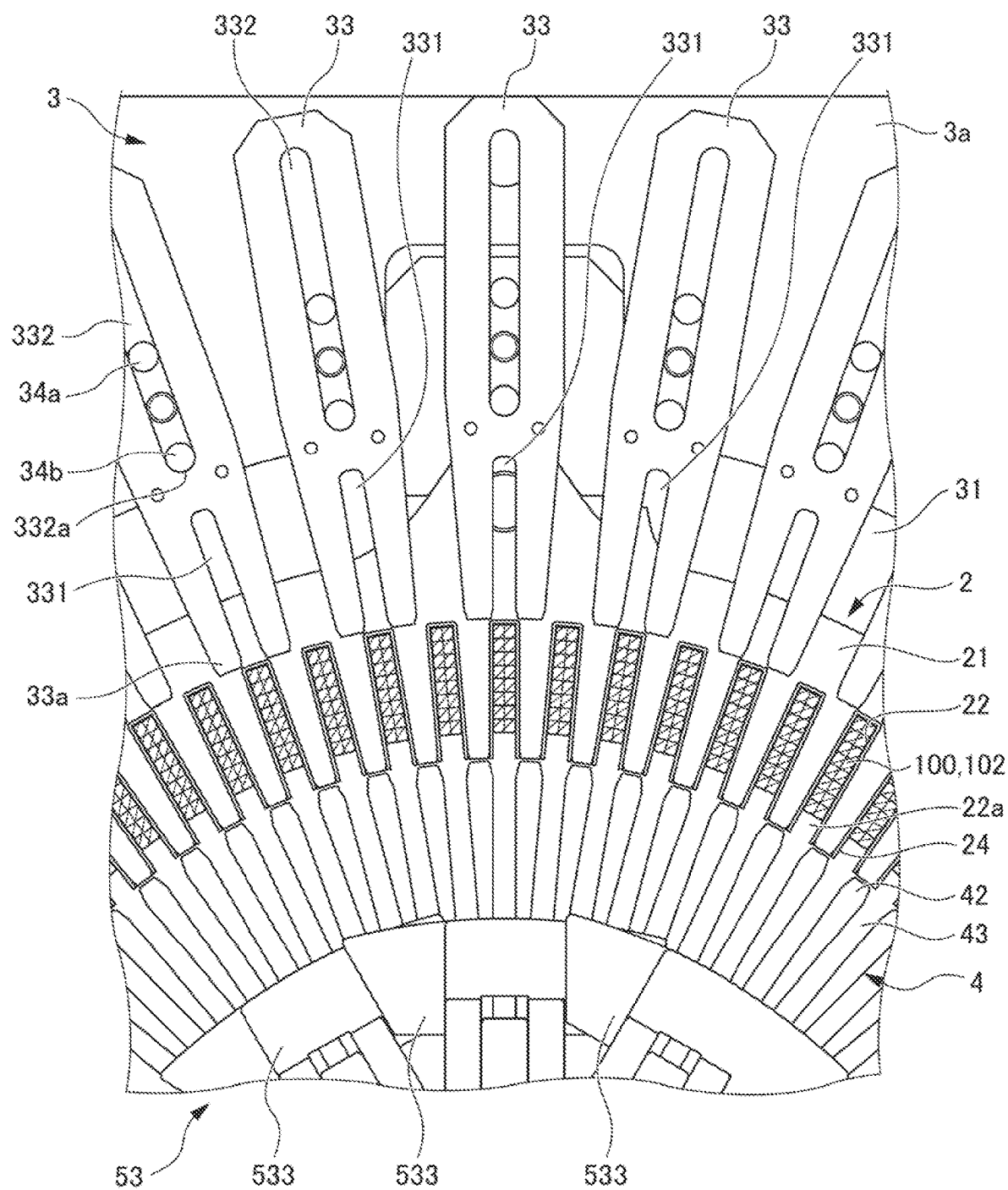
FIG. 28 is a partially enlarged view showing a state in which the cuff guide is retracted after insertion of the belt-shaped coil into the slot.

When the coil expanders 53 of the two coil expansion mechanisms 5 expands most in diameter, the straight portions 102 of the belt-shaped coil 100 on the coil winding jig 4 are fully inserted into the slots 22 of the stator core 2 as shown in FIG. 28, so that the belt-shaped coil 100 is mounted in the slots 22 of the stator core 2. The coil expanders 53 of the two coil expansion mechanisms 5 may operate so as to expand in diameter simultaneously with each other, or may operate so as to successively expand in diameter with a time lag set therebetween so that the straight portions 102 are inserted into the openings 22a of the slots 22 obliquely with respect to the radial direction.

Figure 29:
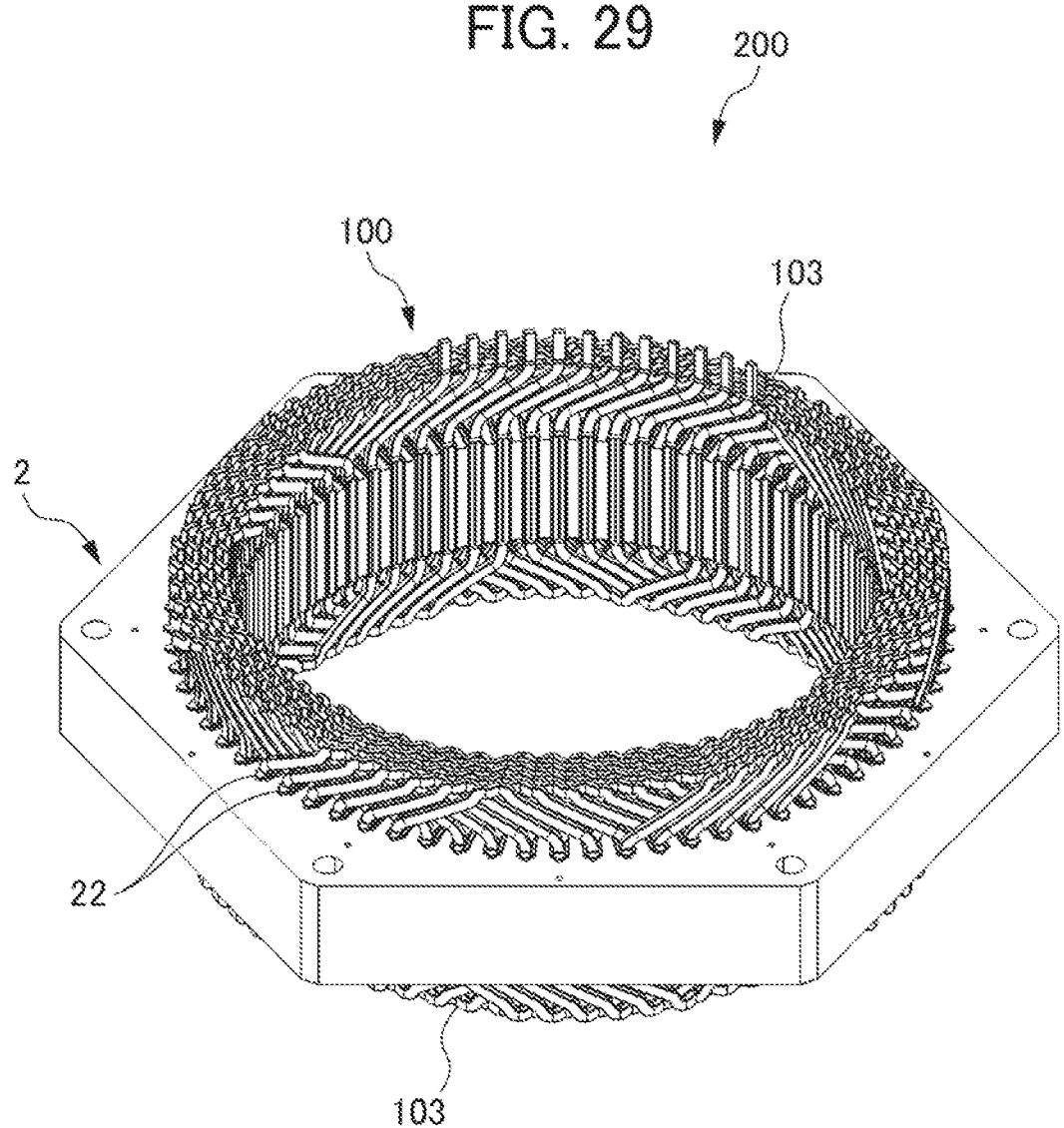
FIG. 29 is a perspective view showing a stator in which the belt-shaped coil is mounted in the slots along the circumferential direction.

Thereafter, the cuff guides 33 move radially outward and completely retract from the end faces 2a of the stator core 2, the coil expanders 53 both decrease in diameter, and the coil expansion mechanisms 5 are both separated from the coil winding jig 4. As a result, as shown in FIG. 29, the stator 200 including the stator core 2 that has the belt-shaped coil 100 mounted in the slots 22 of the stator core 2 is produced.

As described above, the coil mounting apparatus 1 of the present embodiment inserts the straight portions 102 of the annularly wound belt-shaped coil 100 from the inside of the stator core 2 into the slots 22 each having the insulating paper sheet 24 disposed therein so as to mount the belt-shaped coil 100 along the circumferential direction of the stator core 2. The insulating paper sheets 24 has the cuff portions 24a protruding from the axial end faces 2a of the stator core 2. The coil mounting apparatus 1 includes the stator core fixing jig 3 that fixes the stator core 2 at a predetermined position and in a predetermined posture, the coil winding jig 4 that is arranged inside the stator core 2 fixed to the stator core fixing jig 3 and winds therearound the belt-shaped coil 100 in an annular shape while the straight portions 102 of the belt-shaped coil 100 are inserted into the inter-comb-teeth grooves 43 arranged radially on the outer periphery of the coil winding jig 4, and the cuff guides 33 that are provided on the stator core fixing jig 3 and each have the guide groove 311 for supporting the cuff portion 24a. The guide groove 331 includes the cuff portion-supporting sub-groove 331a that supports the cuff portion 24a from both sides in the circumferential direction of the stator core 2, and the coil-guiding sub-groove 311b having the groove width W2 smaller than the groove width W1 of the cuff portion-supporting sub-groove 331a. The coil-guiding sub-groove 311b is further away from the axial end face 2a of the stator core 2 than the cuff portion-supporting sub-groove 331a. According to this configuration, each of the cuff portions 24a of the insulating paper sheets 24 in the slots 22 is supported from both sides in the circumferential direction of the stator core 2 by the cuff portion-supporting sub-groove 331a of the guide groove 331 of the cuff guide 33. Therefore, the cuff portion 24a is positioned with respect to the slot 22. In addition, each straight portion 102 comes into contact with the coil-guiding sub-groove 331b of the guide groove 331, so that the straight portion 102 is guided into the slot 22 without catching the cuff portion 24a. Therefore, the coil mounting apparatus 1 is provided which eliminates or reduces the risk that the straight portions 102 of the annularly wound belt-shaped coil 100 catch the insulating paper sheets 24 in the slots 22 when the straight portions 102 are inserted into the slots 22 from the inside of the stator core 2.

The inter-comb-teeth groove 43 of the coil winding jig 4 of the present embodiment has, in its radially outer portion, the narrow portion 43a whose groove width W3 is smaller than the groove width W2 of the coil-guiding sub-groove 311b of the guide groove 311. According to this configuration, just before the straight portions in the inter-comb-teeth grooves of the coil winding jig are inserted into the slots of the stator core, the straight portions undergo position correction due to the narrow portions. Therefore, the straight portions in the inter-comb-teeth grooves can be smoothly received on the insulating paper sheets in the slots.

The coil mounting method of the present embodiment includes inserting the straight portions 102 of the annularly wound belt-shaped coil 100, from the inside of the stator core 2, into the slots 22 having the insulating paper sheets 24 disposed therein, thereby mounting the belt-shaped coil 100 to the stator core 2 along the circumferential direction of the stator core 2. Each insulating paper sheet 24 has the cuff portions 24a protruding from the axial end faces 2a of the stator core 2, and each cuff portion 24a is supported by the cuff portion-supporting sub-groove 331a of the cuff guide 33. The cuff guide 33 has the guide groove 331 having the cuff portion-supporting sub-groove 331a for supporting the cuff portion 24a from both sides in the circumferential direction of the stator core 2, and the coil-guiding sub-groove 331b that is located farther away from the end face 2a of the stator core 2 than the cuff portion-supporting sub-groove 331a and that has the groove width W2 smaller than the groove width W1 of the cuff portion-supporting sub-groove 331a. In a state where the cuff portions 24a are supported by the cuff portion-supporting sub-grooves 331a, the annularly wound belt-shaped coil 100 is expanded in diameter, the straight portions 102 are inserted into the slots 22, and the movement of the straight portions 102 is guided by the coil-guiding sub-grooves 331b. According to this configuration, each of the cuff portions 24a of the insulating paper sheets 24 in the slots 22 is supported from both sides in the circumferential direction of the stator core 2 by the cuff portion-supporting sub-groove 331a of the guide groove 331 of the cuff guide 33. Therefore, the cuff portions 24a can be positioned with respect to the slots 22. Further, the straight portions 102 are brought into contact with the coil-guiding sub-grooves 331b of the guide grooves 331, making it possible to guide the straight portions 102 into the slots 22, while preventing the cuff portions 24a from being caught by the straight portions 102. Therefore, the coil mounting method is provided which eliminates or reduces the risk that the straight portions 102 of the annularly wound belt-shaped coil 100 catch the insulating paper sheets 24 in the slots 22 when the straight portions 102 are inserted into the slots 22 from the inside of the stator core 2.

The coil mounting apparatus 1 of the embodiment described above is configured so that the axial directions of the stator core 2 and the coil winding jig 4 are set parallel to a horizontal direction, but it may be configured so that the axial directions of the stator core 2 and the coil winding jig 4 are set to any direction other than the horizontal direction, such as a vertical direction.

The coil winding jig 4 having the belt-shaped coil 100 wound therearound in an annular shape may be inserted into the stator core 2 fixed to the stator core fixing jig 3, while being held by the holder 52 of any one of the coil expansion mechanisms 5.

Both end faces 3a of the stator core fixing jig 3 may each be provided with cuff guides 33 in the number corresponding to the number of the slots 22 of the stator core 2.

EXPLANATION OF REFERENCE NUMERALS

1: coil mounting apparatus
2: stator core
2a: end face
22: slot
24: insulating paper sheet
24a: cuff portion
3: stator core fixing jig
33: cuff guide
331: guide groove
331a: cuff portion-supporting sub-groove
331b: coil-guiding sub-groove
4: coil winding jig
43: inter-comb-teeth groove
43a: narrow portion
100: belt-shaped coil
102: straight portion

What is claimed is:

1. A coil mounting apparatus for mounting an annularly wound belt-shaped coil to a stator core along a circumferential direction of the stator core by inserting straight portions of the annularly wound belt-shaped coil from an inside of the stator core into slots each having an insulating paper sheet disposed within the slot, and
said insulating paper sheet having a cuff portion protruding from an axial end face of the stator core, the coil mounting apparatus comprising:
a stator core fixing jig that fixes to a center portion of a base, said stator core fixing jig is configured to hold the stator core at a predetermined position and in a predetermined posture;
a coil winding jig that is arrangeable inside the stator core fixed to the stator core fixing jig and the coil winding jig is configured to hold the annularly wound belt-shaped coil thereon while the straight portions of the annularly wound belt-shaped coil are inserted into inter-comb-teeth grooves arranged radially on an outer periphery of the coil winding jig; and
a coil expansion mechanism that expands the belt-shaped coil wound around the coil winding jig;
a base that fixes the stator core fixing jig;
a pair of support substrates that stand on the base and face each other with the stator core fixing jig interposed therebetween; and
the stator core fixing jig further comprises a cuff guide, said cuff guide includes a guide groove for supporting the cuff portion of the insulating paper sheet, and is movable forward and backward along a radial direction of the stator core by an actuator, and has a guide groove for supporting the cuff portion,
wherein the coil expansion mechanism is movable in a direction in which the coil expansion mechanism comes into contact with the coil winding jig and in a direction in which the coil expansion mechanism separates from the coil winding jig when the support substrates are linearly moved on the base by driving means,
wherein the cuff guide comprises a bottom surface that faces the stator core fixing jig and faces the axial end face of the stator core in a state where the cuff guide is advanced toward the slot of the stator core, and a top surface opposite the bottom surface in a thickness direction of the cuff guide and in an axial direction of the stator core,
wherein the guide groove includes a cuff portion-supporting sub-groove immediately adjacent to the bottom surface of the cuff guide, and a coil-guiding sub-groove that is spaced apart from the bottom surface of the cuff guide in the thickness direction of the cuff guide, and that is located further away from the axial end face of the stator core than the cuff portion-supporting sub-groove in a state where the cuff guide is advanced toward the slot of the stator core, and wherein, in a circumferential direction of the stator core, a groove width of the coil-guiding sub-groove is smaller than a groove width of the cuff portion-supporting sub-groove.

2. The coil mounting apparatus according to claim 1, wherein each of the inter-comb-teeth grooves of the coil winding jig includes a radially outer portion thereof, a narrow portion having a groove width smaller than that of the coil-guiding sub-groove of the guide groove.

3. The coil mounting apparatus according to claim 1, wherein a height of the cuff portion-supporting sub-groove along the axial direction of the stator core is equal to or greater than a protruding height of the cuff portion protruding from the axial end face of the stator core.

4. The coil mounting apparatus according to claim 1, wherein a groove width of the coil-guiding sub-groove is equal to or larger than a width of each of the straight portions of the belt-shaped coil that are inserted into the slots.

5. The coil mounting apparatus according to claim 1, wherein the cuff guide further includes, on both side surfaces of an inner end thereof,
  cut-out portions that reduce a width of the cuff guide in a region near the bottom surface along a length direction of the cuff guide, and
  overhanging portions that protrude more laterally than the cut-out portions.

6. The coil mounting apparatus according to claim 1, wherein the cuff portion-supporting sub-groove and the coil-guiding sub-groove are continuous with each other in the thickness direction of the cuff guide.

7. The coil mounting apparatus according to claim 1, wherein the cuff portion-supporting sub-groove is formed closer to the axial end face of the stator core, while the coil-guiding sub-groove is formed away from the axial end face of the stator core.

* * * * *